United States Patent
Rohs et al.

(10) Patent No.: US 9,540,930 B2
(45) Date of Patent: Jan. 10, 2017

(54) AXIAL PISTON MOTOR AND METHOD FOR OPERATION OF AN AXIAL PISTON MOTOR

(71) Applicant: GETAS Gesellschaft fuer thermodynamische Antriebssysteme mbH, Dueren (DE)

(72) Inventors: Ulrich Rohs, Dueren (DE); Dieter Voigt, Aachen (DE)

(73) Assignee: GETAS Gesellschaft fuer thermodynamische Antriebssysteme mbH, Dueren (DE)

( * ) Notice: Subject to any disclaimer, the term of this patent is extended or adjusted under 35 U.S.C. 154(b) by 0 days.

(21) Appl. No.: 14/828,719

(22) Filed: Aug. 18, 2015

(65) Prior Publication Data

US 2015/0354356 A1 Dec. 10, 2015

Related U.S. Application Data

(63) Continuation of application No. 13/979,895, filed as application No. PCT/DE2012/000039 on Jan. 18, 2012, now Pat. No. 9,194,402.

(30) Foreign Application Priority Data

Jan. 19, 2011 (DE) .......... 10 2011 008 957
Apr. 27, 2011 (DE) .......... 10 2011 018 846

(51) Int. Cl.
*F02B 19/00* (2006.01)
*F01B 3/00* (2006.01)
(Continued)

(52) U.S. Cl.
CPC .......... *F01B 3/0002* (2013.01); *F01B 3/0044* (2013.01); *F02B 75/26* (2013.01); *F02G 3/02* (2013.01);
(Continued)

(58) Field of Classification Search
CPC ..... F01B 3/0002; F01B 3/0044; F28F 9/0219; F28F 2265/26; F02G 3/02; F02G 2254/10; F23K 5/06; F23K 5/20; F15B 15/00; F02B 75/26; F23C 5/32; F23C 6/047; F23C 2202/20; F02C 2900/03005; F02C 2202/20; F02M 31/125; Y02T 10/121
(Continued)

(56) References Cited

U.S. PATENT DOCUMENTS

| 1,922,173 A | 8/1933 | Pedersen |
| 3,855,980 A | 12/1974 | Weisz et al. |

(Continued)

FOREIGN PATENT DOCUMENTS

| CN | 1142036 A | 2/1997 |
| CN | 101932792 A | 12/2010 |

(Continued)

OTHER PUBLICATIONS

International Search Report of PCT/DE2012/000039, Dec. 13, 2012.

(Continued)

*Primary Examiner* — Hai Huynh
(74) *Attorney, Agent, or Firm* — Collard & Roe, P.C.

(57) ABSTRACT

To provide an axial piston motor, comprising at least one main burner, which has at least one main combustion space and at least one main nozzle space, and comprising at least one pre-burner, which has at least one pre-combustion space and at least one pre-nozzle space, wherein the pre-combustion space is connected to the main nozzle space by way of at least one hot gas feed, that has improved operating and control characteristics even under non-steady-state operating conditions, the pre-nozzle space of the pre-burner has at least one auxiliary hot gas feed.

15 Claims, 9 Drawing Sheets

Figure 1:
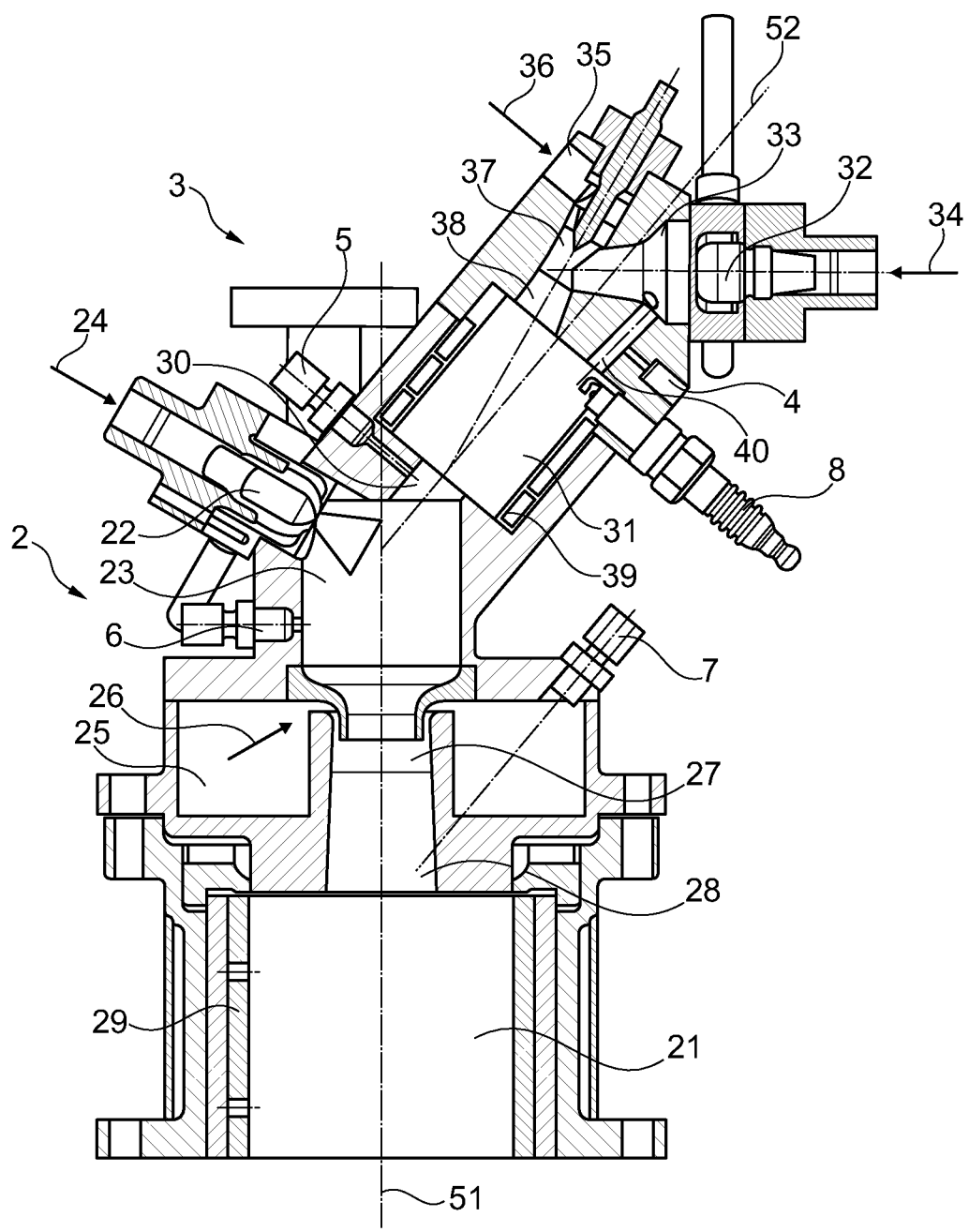

(51) Int. Cl.
*F02G 3/02* (2006.01)
*F23K 5/06* (2006.01)
*F23K 5/20* (2006.01)
*F02B 75/26* (2006.01)
*F23C 5/32* (2006.01)
*F23C 6/04* (2006.01)
*F15B 15/00* (2006.01)
*F28F 9/02* (2006.01)
*F02M 31/125* (2006.01)

(52) U.S. Cl.
CPC ............ *F02M 26/01* (2016.02); *F15B 15/00* (2013.01); *F23C 5/32* (2013.01); *F23C 6/047* (2013.01); *F23K 5/06* (2013.01); *F23K 5/20* (2013.01); *F28F 9/0219* (2013.01); *F02G 2254/10* (2013.01); *F02M 31/125* (2013.01); *F23C 2202/20* (2013.01); *F23C 2900/03005* (2013.01); *F28F 2265/26* (2013.01); *Y02T 10/121* (2013.01)

(58) Field of Classification Search
USPC ....... 123/253, 260, 261, 285, 286, 543, 557, 123/568.14, 568.15
See application file for complete search history.

(56) References Cited

U.S. PATENT DOCUMENTS

| | | | |
|---|---|---|---|
| 3,932,987 | A | 1/1976 | Munzinger |
| 4,041,916 | A | 8/1977 | Iida et al. |
| 4,160,526 | A | 7/1979 | Flanagan |
| 4,372,264 | A | 2/1983 | Trucco |
| 4,391,233 | A | 7/1983 | Jackisch |
| 4,476,840 | A | 10/1984 | Budnicki et al. |
| 4,594,976 | A | 6/1986 | Gonzalez |
| 4,696,270 | A | 9/1987 | Pischinger |
| 4,779,579 | A | 10/1988 | Sukava et al. |
| 4,861,262 | A | 8/1989 | Gitman et al. |
| 5,829,967 | A | 11/1998 | Chyou |
| 6,412,273 | B1 | 7/2002 | Rohs |
| 6,415,775 | B1 | 7/2002 | Lahti et al. |
| 6,981,484 | B2 | 1/2006 | Lampard |
| 7,025,036 | B2 | 4/2006 | Lampard |
| 8,910,612 | B2 | 12/2014 | Woo et al. |
| 2004/0177611 | A1 | 9/2004 | Langenfeld et al. |
| 2010/0258065 | A1 | 10/2010 | Rohs |
| 2012/0118261 | A1 | 5/2012 | Rohs et al. |

FOREIGN PATENT DOCUMENTS

| | | |
|---|---|---|
| DE | 25 07 129 A1 | 9/1976 |
| DE | 42 33 724 A1 | 9/1993 |
| DE | 199 09 689 A1 | 9/2000 |
| DE | 10 2005 037 156 A1 | 2/2007 |
| DE | 10 2006 020 639 A1 | 11/2007 |
| DE | 10 2007 047 280 A1 | 4/2009 |
| EP | 1 508 744 A1 | 2/2005 |
| EP | 1 903 207 A1 | 3/2008 |
| JP | S53-119431 A | 10/1978 |
| JP | H10-317936 A | 12/1998 |
| JP | 2000-265847 A | 9/2000 |
| JP | 2008-215161 A | 9/2008 |
| WO | 2005/080781 A1 | 9/2005 |
| WO | 2008/094073 A1 | 8/2008 |
| WO | 2009/062473 A2 | 5/2009 |
| WO | 2011/009451 A2 | 1/2011 |

OTHER PUBLICATIONS

German Search Report in 10 2011 018 846.0, dated Nov. 22, 2012, with English translation of relevant parts.
Japanese Office Action dated Dec. 22, 2015 in Japanese Application No. 2013-549714.
European Examination Report dated Dec. 23, 2015 in European Application No. 15169512.9 with English translation of the relevant parts.
Chinese Office Action in CN 201280014195.4, dated Jun. 3, 2015.

AXIAL PISTON MOTOR AND METHOD FOR OPERATION OF AN AXIAL PISTON MOTOR

CROSS REFERENCE TO RELATED APPLICATIONS

This application is a continuation of and Applicant claims priority under 35 U.S.C. §120 of U.S. application Ser. No. 13/979,895 filed on Jul. 16, 2013, which application is a national stage application under 35 U.S.C. §371 of PCT Application No. PCT/DE2012/000039 filed on Jan. 18, 2012, which claims priority under 35 U.S.C. §119 from German Patent Application No. 10 2011 018 846.0 filed on Apr. 27, 2011 and German Patent Application No. 10 2011 008 957.8 filed on Jan. 19, 2011, the disclosures of each of which are hereby incorporated by reference. Certified copies of priority German Patent Application No. 10 2011 018 846.0 and German Patent Application No. 10 2011 008 957.8 are contained in parent U.S. application Ser. No. 13/979,895. The International Application under PCT article 21(2) was not published in English.

The invention relates to an axial piston motor and to a method for operation of an axial piston motor.

Axial piston motors are sufficiently known from the state of the art, and are characterized as energy-converting machines with internal continuous combustion. In this connection, a compressor stage of the axial piston motor, having pistons that are disposed axially to a drive shaft and oscillate, conveys compressed air to an expander stage, also having pistons that are disposed axially to a drive shaft and oscillate. Mechanical drive energy is then made available at the power take-off shaft of the axial piston motor, while fuel is fed to the compressed air between the compressor stage and the expander stage, the fuel/air mixture is combusted, and positive piston work is made available by means of the exhaust gas that results from this, with a volume increase within the expander stage.

Thus, for example, the document PCT/DE 2010/000874, which has not yet been published, shows a power machine that functions according to this principle of action. In this connection, heat release of the fuel does not take place within a cylinder, by means of combustion of a closed load, as it does in power machines that work intermittently, but rather within a burner that works continuously. These burners, which are used for axial piston motors, have a mixing tube connected with a combustion space, in which tube the fuel to be burned and the air conveyed by the compressor stage are mixed and combusted, forming a stationary flame at the end of the mixing tube. For stabilization of combustion, an axial piston motor according to the state of the art additionally has a pre-burner, by means of which a hot gas that is inert, to a great extent, is added to the fuel before entry into the mixing tube. This in turn brings about treatment of the fuel.

While treatment of the fuel within the burner, also by way of heating means, such as glow plugs, for example, is known in the state of the art, mixing in hot gas that is inert, to a great extent, such as already combusted air or a gas with $\lambda \le 0$, has proven itself in practice. In this regard, in order to produce a hot gas that is inert, to a great extent, a further pre-burner is switched ahead of the burner of an axial piston motor, which pre-burner in turn continuously combusts a fuel with fresh air and feeds the resulting hot gas to the actual burner used as the main burner. In this connection, the document PCT/DE 2010/000874, which has not yet been published, discloses that it is advantageous to prepare even the fuel that is fed to the pre-burner, beforehand, for example by means of glow plugs.

In the case of greater demands on regulatability, and, in particular, in the case of pulsating operating conditions within the overall arrangement of main burner(s) and pre-burner(s), whereby pulsations occur due to the load change in the expander stage, despite continuous combustion, this arrangement with a pre-burner and a main burner according to the state of the art mentioned above has disadvantages in terms of flame stability. In the case of pulsating operation or other non-steady-state operating conditions of the burner or of the axial piston motor, or also in the case of operating point jumps, states can occur in the pre-burner or in the main burner that can actually lead to the flame being extinguished, in each instance.

It is therefore the task of the present invention to make available an axial piston motor having an improved operating and regulating behavior, even under non-steady-state operating conditions.

This task is accomplished by an axial piston motor having at least one main burner that has at least one main combustion space as well as at least one main nozzle space, and having at least one pre-burner that has at least one pre-combustion space as well as at least one pre-nozzle space, whereby the pre-combustion space is connected with the main nozzle space by way of at least one hot gas feed, and the axial piston motor is characterized in that the pre-nozzle space of the pre-burner has at least one auxiliary hot gas feed.

In this regard, the auxiliary hot gas feed makes it possible to treat the fuel stream that is fed to a pre-mixing tube, within the pre-nozzle space, so that a significantly more stable flame is produced at the outlet from the pre-mixing tube and thus the pre-burner can be operated with low emissions, due to the treatment of the fuel, on the one hand, and on the other hand, the pre-burner is significantly insensitive to pulsations in the pre-combustion space and to changed operating conditions.

Furthermore, a method for operation of an axial piston motor having at least one main burner and at least one pre-burner is proposed, whereby an exhaust gas stream of the pre-burner is mixed into a main fuel stream of the main burner, and the method is characterized in that an exhaust gas stream is mixed into a pre-fuel stream of the pre-burner. Here, too, more stable flame formation and significantly better emissions behavior is achieved, in advantageous manner, as explained above.

A further method for operation of an axial piston motor having at least one compressor stage, having at least one main burner and having at least one pre-burner is proposed, for the formation of a stable flame in the main burner and also in the pre-burner of an axial piston motor and for better emissions behavior of an axial piston motor, alternatively or cumulatively to the preceding embodiments and methods for operation of an axial piston motor, whereby the compressor stage feeds a main air stream to the main burner and a pre-air stream to the pre-burner, and whereby an exhaust gas stream from the pre-burner is mixed into a main fuel stream of the main burner, and the method is characterized in that the exhaust gas stream mixed into the main fuel stream is formed from the pre-air stream and a pre-fuel stream.

Furthermore, alternatively or cumulatively, a method for operation of an axial piston motor having at least one compressor stage, having at least one main burner and having at least one pre-burner is proposed, whereby the compressor stage feeds a main air stream to the main burner and a pre-air stream to the pre-burner, whereby an exhaust gas stream from the pre-burner is fed into a main fuel stream of the main burner, and whereby the method is characterized in that a combustion air ratio between a pre-fuel stream and the pre-air stream and a combustion air ratio between the main fuel stream and the main air stream can be adjusted in one stage. It is advantageous, in such method management, that on the one hand, only one combustion space for the main burner and for the pre-burner that is optimized in terms of flow technology is required, and on the other hand, the method management with single-stage combustion ensures that no exhaust gas with incompletely combusted educts or an exhaust gas with an undesirably high proportion of residual oxygen is fed to the mixing zone of the main nozzle chamber. Preferably, an exhaust gas without residual oxygen is fed to the main nozzle space or to the main fuel stream.

"Single-stage" means, in this connection, that the entire air used for adjusting the stoichiometric ratio, in each instance, is mixed into the fuel stream, in each instance, in a single mixing process. Consequently, neither multi-stage combustion with discontinuous mixing processes that follow one another in time nor a process of the resulting exhaust gas becoming leaner due to further mixing in of air takes place.

In this connection, it should be emphasized that in the present case, hot gas that is inert or inert to a great extent is not necessarily understood to mean an inert gas such as helium, but also the term covers hot gases that do not directly participate in combustion, but might participate in subsequent reactions. Thus, in particular, combustion exhaust gases can be understood to be inert hot gases in this sense, even if these still continue to react during reactions that follow combustion.

Also, alternatively or cumulatively to the methods for a solution for the task stated initially as explained above, a method for operation of an axial piston motor having at least one compressor stage, having at least one main burner and having at least one pre-burner is proposed, whereby the compressor stage feeds a main air stream to the main burner and a pre-air stream to the pre-burner, whereby an exhaust gas stream from the pre-burner is mixed into a main fuel stream of the main burner, and whereby the method is characterized in that the main fuel stream and the main air stream are mixed upstream from a main combustion space. This has the result that the fuel contained in the main fuel stream and the air oxygen of the main air stream are homogeneously distributed in the resulting mixture while passing through a mixing segment, and particularly low-emission and, at the same time, efficient combustion can be initiated in a combustion zone that follows directly or in the combustion chamber that follows directly.

As is immediately evident, pre-reactions can also occur homogeneously distributed in the mixture, in a method management with a mixing segment, and thereby the subsequent combustion does not have any high temperature gradients and therefore no significant concentration zones for increased formation of emissions. It is understood that "temperature gradients" in the sense of the method for mixing of the main fuel stream with the main air stream explained above means those temperature variations that form perpendicular to the flow direction, in other words along the flame front. Ultimately, a uniformly configured flame front is the advantageous result of homogeneous mixing in the mixing segment.

Further advantageous method management occurs if the main fuel stream and the main air stream are mixed in a main mixing tube. The use of a main mixing tube for the method explained above advantageously promotes the geometric definition of the mixing segment that forms. Thus, a concrete influence can be taken on mixing of the mail fuel stream and the main air stream, in that the mixing segment is predetermined by walls of the main mixing tube.

It is particularly advantageous for the method for mixing of the main fuel stream and the main air stream if the exhaust gas stream of the pre-burner is mixed into the main fuel stream before mixing of the main fuel stream with the main air stream. It is immediately evident that in a flow with multiple gaseous components, step-by-step pre-mixing leads to clearly better results in the individual mixing stages. Complete prior mixing of the main fuel stream with the exhaust gas stream of the pre-burner therefore has very advantageous effects on subsequent mixing in of the main air stream. In particular, the reactions initiated in the main fuel stream are controlled particularly well by means of step-by-step mixing, in that influence can be taken, in targeted manner, on reaction times, if mixing in of oxygen takes place with time offset, as explained above.

For an improvement in the reaction behavior of the fuel used, it can furthermore be advantageous for a method for mixing of the main fuel stream with the main air stream if the main fuel stream flows through a mixing nozzle before the main fuel stream is mixed with the main air stream in a ring nozzle. This embodiment of the method also leads, as explained above, to an improved combustion sequence, in that influence can be taken, in targeted manner, on pre-reactions of the fuel. The use of an advantageously configured mixing nozzle offers not only the possibility of influencing reaction times, but also the possibility of defining the geometric flow progression and thus the spatial mixing behavior of the main fuel stream with the exhaust gas stream. Thus, if this appears to be necessary, a spin can be imparted to the flow in a mixing nozzle, or, if a spin was already present, an essentially spin-free flow to the main combustion chamber can be ensured.

Alternatively or cumulatively to the preceding solutions, in order to accomplish the task stated initially, an axial piston motor having at least one main burner that has at least one main combustion space as well as at least one main nozzle space, and having at least one pre-burner that has at least one pre-combustion space as well as at least one pre-nozzle space is proposed, whereby the pre-combustion space is connected with the main nozzle space by way of at least one hot gas feed, and whereby the axial piston motor is characterized by an idle and at least a partial load, as well as by a main nozzle of the main burner and a pre-nozzle of the pre-burner, which are coupled with one another by means of a control unit.

Coupling of the main nozzle and the pre-nozzle can therefore be advantageously used for overall regulation of the axial piston motor, if, as the result of changing operating conditions, the different fuel streams and air streams of the main burner and of the pre-burner must be adapted to these different operating conditions.

Alternatively or cumulatively to this, the task indicated above is also accomplished by a method for operation of an axial piston motor having at least one main burner and having at least one pre-burner, whereby an exhaust gas stream of the pre-burner is mixed into a main fuel stream of the main burner, and the method is characterized in that the main burner is ignited during a load jump from idle to a lowest partial load, using the main fuel stream, and a pre-fuel stream of the pre-burner is reduced, during the load jump, by at least half the amount of the main fuel stream, more preferably by the amount of the main fuel stream.

Coupling of the main nozzle with the pre-nozzle by way of a control unit, or the reduction of the pre-fuel stream when igniting the main burner, advantageously contributes to the stability of the combustion behavior of the overall burner, independent of the other characteristics of the present invention, in that the load jump from idle to a lowest partial load takes place as uniformly as possible and without any greater difference in the initial torque of the axial piston motor. Thus, load surges that can be harmful for a drive train that follows the axial piston motor and for driving comfort in a motor vehicle with an axial piston motor can be reduced.

In this connection, in idle the pre-burner already preferably delivers sufficient burner output to operate the axial piston motor in stable manner during this idling. If a higher load is demanded and thus the main burner is turned on, a particularly uniform and constant increase in the power of the entire burner is achieved in that the total fuel stream is at first kept constant, in that the pre-fuel stream is preferably reduced by about the amount of the main fuel stream, as explained above. As has been proven in practical experiments, however, even a reduction of the pre-fuel stream by half the main fuel stream used is already sufficient for a uniform load jump of the axial piston motor. As is immediately evident, however, any other ratio or any other coupling between the pre-nozzle and the main nozzle and therefore also between the pre-fuel stream and the main fuel stream can be adjusted.

Alternatively or cumulatively to the above embodiments of the invention, in order to accomplish the task stated initially, an axial piston motor having at least one compressor stage, having at least one main burner that has at least one main combustion space as well as at least one main nozzle space with a main fuel stream, having at least one pre-burner that has at least one pre-combustion space as well as at least one pre-nozzle space with a pre-fuel stream, and having at least one main air line between the compressor stage and a main mixing tube of the pre-burner is proposed, whereby the pre-combustion space is connected with the main nozzle space by way of at least one hot gas feed, and the axial piston motor is characterized by at least one secondary air line between the compressor stage and the main burner, which line is connected with the main combustion space and/or to the main burner downstream from the main combustion space.

Accordingly, alternatively or cumulatively to the methods described above to accomplish the task stated initially, a method for operation of an axial piston motor having at least one main burner, having at least one pre-burner and having an air stream is proposed, whereby the main burner has at least one main combustion space as well as at least one main nozzle space with a main fuel stream, whereby the pre-burner has at least one pre-combustion space as well as at least one pre-nozzle space with a pre-fuel stream, whereby the pre-combustion space is connected with the main nozzle space by way of a hot gas feed, whereby the air stream has a main air stream for the main burner as well as a pre-air stream for the pre-burner, and whereby the method is characterized in that during an idle and/or a partial load of the axial piston motor, at least however during a load jump from idle to a lowest partial load, at least one secondary air stream is taken from the air stream, and the secondary air stream is fed into an exhaust gas stream downstream from and/or within the main combustion space.

By means of this secondary air line explained above, or of the secondary air stream, once again, the operating behavior of the axial piston motor during idle, under a partial load, and, in particular, during a load jump from idle to a partial load, can be advantageously operated in particularly uniform and stable manner, in other words with a limitation of the load jump that is used.

A secondary air line, whereby this secondary air line as well as the main air line and the pre-air line advantageously can be parallel partial air lines of a common overall air line connected with the compressor stage, thereby making it possible to simplify control of the motor also independent of the other characteristics of the present invention, consequently advantageously reduces the amount of combustion air fed to the main burner, so that the fuel stream in the main burner can also be reduced, on the basis of the lean limits that must be adhered to.

A reduction in the main fuel stream without a reduction in the main air stream would lead to extinguishing of the flame in the main burner in the event of a drop below the lean limits, as is immediately evident. Thus, the power of the burner can be set lower, while maintaining a constant fuel/air ratio, than would be the case without a secondary air line. The secondary air, which is then mixed back into the remaining air and exhaust gas stream behind a combustion zone of the main mixing tube in the combustion space, leads to further leanness of the exhaust gas at this location, whereby the burner, particularly the main burner, nevertheless can be operated with stable combustion and with low emissions, for the reasons explained above.

In this connection, "lean limit" refers to the fuel/air ratio at which operation of the burner or of the main burner is still possible with a stable flame, without extinguishing of the flame.

"Idle" refers to that operating point of the axial piston motor at which no or very low power is being given off to a power take-off shaft of the axial piston motor, and the axial piston motor can be operated at the lowest stable speed of rotation. "Partial load," in contrast to this, refers to any other operating point between idle and full load, whereby "full load" refers to the maximal torque given off at any desirable speed of rotation, in each instance. Accordingly, "full load" explicitly does not refer to the point of maximal power output. Accordingly, a "lowest partial load" is the point in the characteristic field of the axial piston motor at which the axial piston motor gives off the smallest possible positive power that lies above the idle power, with operation of the main burner and at the idle speed of rotation. As was already explained above, it is possible that the axial piston motor is operated solely with the pre-burner in idle.

For an axial piston motor according to the embodiments explained above, it is furthermore advantageous if the pre-nozzle space is connected with the pre-combustion space by way of the auxiliary hot gas feed. In this way, the possibility exists of allowing treatment of the fuel injected into the pre-nozzle space by means of the exhaust gas taken from the pre-combustion space, in simple and operationally reliable manner. In this regard, internal exhaust gas recirculation within the pre-burner is implemented by way of the reflux of exhaust gas from the pre-combustion space into the pre-nozzle space.

For the remainder, it is furthermore advantageous for an axial piston motor having at least one main burner and having at least one pre-burner, which has at least one pre-combustion space as well as at least one pre-nozzle space, even independent of the other characteristics of the present invention, if the pre-nozzle space is connected with an auxiliary burner by way of an auxiliary hot gas feed. Therefore a further possibility exists of feeding exhaust gas or hot inert gas to the pre-nozzle space, without taking an exhaust gas stream from the pre-combustion space. In this connection, it is also possible to other inert gas extensively to the pre-nozzle space as a hot inert gas. This can be, for example, heated nitrogen, carbon dioxide, heated noble gases or also steam, whereby steam, in particular, can be used during combustion for reduction of emissions or for stabilization of the combustion.

It should be pointed out that the term "inert" in connection with combustion air or with combusted air particularly describes a gas mixture that has a component of reactive oxygen of close to 0, and therefore on the one hand, no reaction with further fuel mixed in can take place, and, on the other hand, because of the lack of oxygen, no production of emissions, such as the formation of nitric oxides, can start, whereby nitric oxide is already interpreted as an inert gas because of its inertia. The term "inert gas" is therefore not used exclusively for noble gases and nitrogen but also for exhaust gas with an oxygen content of close to 0.

Also, an axial piston motor can be configured in such a manner that the main fuel stream is gaseous before entry into the main combustion space and/or has a temperature above the highest boiling temperature of a fuel boiling progression. Furthermore, it is also possible and advantageous for an axial piston motor if the pre-fuel stream is gaseous before entry into the pre-combustion space and/or has a temperature above a highest boiling temperature of a fuel boiling progression. In this regard, such an embodiment of an axial piston motor offers the advantage that the evaporation enthalpy required for formation of a mixture is not made available by a reaction heat during combustion, but already before metering of fuel into the combustion air. In this way, the possibility particularly exists of allowing soot-free combustion, because the combustion temperature is far higher in the case of fuel that is already present in gaseous form than would be the case for liquid fuel.

For a liquid fuel, it is also advantageous, in the present connection, if this fuel has approximately the highest temperature of its fuel boiling progression, thereby causing at least volatile components of the fuel to already be present in the gaseous aggregate state. In this connection, "boiling progression" means that part of the boiling curve of a fuel that does not take into consideration a residue or loss during boiling. Thus, the term "boiling progression" refers to the constant curve section of a boiling curve. Furthermore, "liquid fuel" refers to any fuel that is present in liquid form at room temperature and ambient pressure, in other words at 20° C. and 1 bar absolute.

If applicable, chemical or physical breakdown of the fuel can already be brought about in this way, further reducing the emissions produced by the motor.

In the above connection relating to the aggregate state of the fuel, it is furthermore advantageous for a method for operation of an axial piston motor if evaporation heat from the exhaust gas stream is fed to the main fuel stream while the exhaust gas stream is being mixed in, and the main fuel stream makes a transition into a gaseous aggregate state. Also, it is likewise advantageous if evaporation heat from the exhaust gas stream is fed into the pre-fuel stream while the exhaust gas stream is being mixed in, and the pre-fuel stream makes a transition into a gaseous aggregate state. These methods presuppose or require such a high temperature of the exhaust gas, before it is mixed in, that this temperature is sufficient at least for evaporation of the fuel during mixing. As has already been explained above, the heat released from combustion by means of this method during combustion of a fuel/air mixture in the mixing tube of a burner, for example in the pre-mixing tube of the pre-burner or in the main mixing tube of the main burner, is no longer used for evaporation of the fuel by means of this method, and consequently, less soot is formed during combustion, because the actual combustion can take place at a higher temperature level.

Beyond this, in connection with the thermal treatment of the fuel, it is not necessary to exclusively use a liquid fuel for an axial piston motor. It is furthermore just as advantageous to use a gaseous fuel for an axial piston motor, particularly according to the embodiments explained above, because this fuel can also be broken down on a molecular level even if no evaporation enthalpy has to be applied, by means of thermal treatment using pre-reactions, and therefore in turn very low-emission combustion can take place.

Independent of the aggregate state of the fuel, whether gaseous or liquid, it is furthermore advantageous for a method for operation of an axial piston motor if, on the one hand, heat from the exhaust gas stream is transferred to the main fuel stream while the exhaust gas stream is mixed in, and at least a component of the main fuel stream thermally dissociates, at least in part, and/or, on the other hand, heat from the exhaust gas stream is transferred to the pre-fuel stream while the exhaust gas stream is mixed in, and at least a component of the pre-fuel stream thermally dissociates, at least in part. Such method management in an axial piston motor therefore offers the possibility of reducing soot formation not only if the temperature level is raised by making evaporation heat available, but also if the fuel is already treated before formation of the mixture, in such a manner that pre-reactions already occur in this fuel. Thus a possibility exists of preventing or minimizing further emissions, such as nitric oxides, because the reaction time of the fuel with the air required in total for combustion is drastically reduced by means of the pre-reactions that have been initiated, and the formation of nitric oxides is suppressed. Thermally formed nitric oxide that is formed according to the "Zeldovich mechanism," for example, does not have a sufficiently long dwell time to be formed in a sufficient amount, by means of the above embodiment, as is immediately evident.

It is furthermore beneficial for a method for operation of the axial piston motor, for the reasons already stated above, if the exhaust gas stream fed to the pre-fuel stream is taken from the pre-combustion space and/or the exhaust gas stream fed to the pre-fuel stream is taken from an auxiliary burner. In this connection, it is furthermore advantageous for a method for operation of an axial piston motor if the exhaust gas stream fed to the main fuel stream is taken from the pre-combustion space. The advantage of this embodiment was also already explained above, whereby the metering of hot exhaust gas or any hot inert gas into the fuel stream allows advantageous treatment of the fuel for the most low-emission, stable, and rapid combustion possible.

In order to advantageously implement treatment of the fuel in the pre-burner or in the main burner differently, it is furthermore advantageous for a method if mixing of the exhaust gas stream into the pre-fuel stream takes place before mixing of the pre-fuel stream into the pre-air stream and/or if mixing of the exhaust gas stream into the main fuel stream takes place before mixing of the main fuel stream into a main air stream. These embodiments also allow the thermal treatment of the fuel as explained above, so that the fuel can either already be present in gaseous form while it is being mixed in, in the mixing tube, in each instance, or can also have combustion intermediate products.

It is understood that the characteristics explained above are also advantageous for an axial piston motor independent of all the other characteristics of the present invention.

In order to accomplish the task stated initially alternatively or cumulatively to the other characteristics of the invention, an axial piston motor having at least one main burner that has at least one main combustion space as well as at least one main nozzle space, and having at least one pre-burner that has at least one pre-combustion space as well as at least one pre-nozzle space is proposed, whereby the pre-combustion space is connected with the main nozzle space by way of at least one hot gas feed, whereby a main fuel stream of the main burner is introduced into the main nozzle space by means of a main nozzle, and whereby the axial piston motor is characterized in that the main fuel stream has a heating means upstream from the main nozzle.

The better regulatability, according to the task, and the stable running behavior of the axial piston motor, according to the task, can be guaranteed by means of the heating means mentioned above, in that the mixture preparation is improved and supported by means of a heat amount fed in by way of this heating means. In particular, a temperature deficit that might exist shortly after a starting process, which could result from the cold combustion space walls, can be balanced out by way of the heating means. Short-term high load demands on the burner can also be made available, in operationally reliable manner, by means of the additional heating means, if the combustion behavior of the burner does not meet these load demands.

In an advantageous embodiment, the heating means used for heating the main fuel stream can be an electrical heating means. In particular, the heating means can be a glow plug. Use of an electrical heating means or a glow plug as the heating means brings about independence of the heat stream made available for heating from the load and operating state of the axial piston motor, in each instance. Thus, as has already been explained above, the electrical heating means or the glow plug can preferably be used during or after a cold start of the axial piston motor, to heat the main fuel stream.

A corresponding heating means can also be used for the pre-fuel stream or for any other fuel or automotive fuel mixture.

Thus, a further embodiment of a heating means can also consist in that a heat exchanger is used for heating a fuel or automotive fuel stream, and this heat exchanger is disposed in an exhaust gas stream of the axial piston motor. Preferably, in this connection, the heat exchanger can be used directly behind the expander stage of the axial piston motor, where the exhaust gas has a particularly high temperature level.

It is furthermore understood that the terms "fuel" and "automotive fuel" are used synonymously, and that a fuel or automotive fuel can contain any liquid but also gaseous hydrocarbons or hydrocarbon mixtures, but also other energy-containing substances that react exothermically with air. It is also understood that not necessarily air but also another medium compatible with the fuel can be used as a reaction partner.

The use of a heating means is furthermore still advantageous if the heating means, particularly if it is an electrical heating means, is disposed in the immediate vicinity of the main nozzle or of another fuel nozzle. Thus, a heat loss is reduced by means of a particularly short flow path from the heating means to the main nozzle or to an alternative fuel nozzle, and consequently, minimal energy expenditure is required to heat the fuel stream to the desired temperature, in each instance. This desired temperature of the fuel consequently results from the temperature that the fuel is supposed to have upon entry into the planned combustion or mixing space, for example into the main nozzle space, and not from the temperature to which the fuel is directly heated by the heating means.

The characteristics explained above, with regard to fuel or automotive fuel heating, can be advantageous for an axial piston motor even independent of the other characteristics of the present invention.

Alternatively or cumulatively to the above characteristics of the invention, in order to accomplish the task stated initially, an axial piston motor is proposed that comprises at least one main burner that has at least one main combustion space as well as at least one main nozzle space, and at least one pre-burner that has at least one pre-combustion space as well as at least one pre-nozzle space, whereby the pre-combustion space is connected with the main nozzle space by way of at least one hot gas feed, whereby the pre-burner has a pre-burner axis, the hot gas feed has a feed axis, and the main burner has a main burner axis, and whereby the axial piston motor is characterized in that the pre-burner axis and/or the feed axis encloses an angle between 75° and 105°, preferably an angle between 85° and 95°, and most preferably an angle of 90°, with the main burner axis, at least in a projection plane that is oriented not only parallel to the main burner axis but also parallel to the pre-burner axis and/or to the feed axis.

In the present connection, the terms "pre-burner axis," "main burner axis," and "feed axis" refer to axes, in each instance, that are defined by the main flow direction in the modules, in each instance, and generally correspond to the basic geometry of these modules. Pre-burner axis and main burner axis generally correspond to the main symmetry axes of the pre-combustion chamber and of the main combustion chamber, respectively, while the feed axis generally corresponds to the axis of a channel by way of which the hot gas is fed to the main burner. If necessary, namely in an extreme case where no main direction can be assigned to the hot gas feed, because it takes place by way of multiple channels or actually a ring nozzle, the term "feed axis" in the present connection can also cover a plane that describes the main flow direction up to the entry into the main burner or into the main nozzle space. In turn, an axis results from a projection in this plane, on the basis of which axis the angle determination presented above can take place.

The almost right-angle arrangement of the axes described above brings about a high degree of mixing, because the main fuel stream must entrain the hot gas. In this way, the hot gas can develop its effect particularly well, and this particularly applies if the main fuel stream is guided essentially in a straight line or coaxial to the main combustion chamber.

Independent of the placement of the axes described above to accomplish the task, an axial piston motor having at least one main burner that has at least one main combustion space as well as at least one main nozzle space, and having at least one pre-burner that has at least one pre-combustion space as well as at least one pre-nozzle space is proposed, alternatively or cumulatively, also to the other characteristics of the invention, whereby the pre-combustion space is connected with the pre-nozzle space by way of at least one hot gas feed, and whereby the axial piston motor is characterized in that a ring space is provided on the pre-burner side of the main nozzle space. In this connection, it should be emphasized that a ring space is characterized by two concentrically disposed wall regions, an inner wall and an outer wall, by means of which a very uniform movement of the gas flowing through the ring space can be forced to occur. This, independent of the other characteristics of the present invention, brings about very good homogeneity of the hot gas with the main fuel stream.

The ring space and the arrangement of the axes, individually but particularly in interplay, bring about compulsory guidance of the fluid present in the main nozzle space, and reduce zones of a non-homogeneous mixture, in which soot formation can be promoted. Furthermore, a particularly homogeneously mixed fluid, consisting of fuel and exhaust gas or hot gas, has a particularly advantageous effect in the subsequent combustion process of the main burner.

Homogenization of the mixture produced in the main nozzle space is particularly advantageously influenced if the pre-burner axis and/or the feed axis lie tangential to the ring space. The configuration of the aforementioned axes, tangential to the ring space, causes the hot gas to flow into the ring space in particularly uniform manner, so that consequently, undesirable dead area in which the gas stands still can be avoided. In this connection, it should be pointed out that the direction of the pre-burner axis and the direction of the feed axis can diverge if the hot gas feed does not have a cylindrical, conical, or at least essentially one-dimensional progression. In this regard, the hot gas feed can also have a curve-shaped or arc-shaped progression in its longitudinal direction. In such a case, the aforementioned feed axis is defined at every point at which the hot gas feed opens directly into the main nozzle space or into the ring space. Likewise, it is immediately evident that the pre-burner axis and the feed axis coincide if the hot gas feed does not have a significant expanse, in other words has a very short length along these axes.

The pre-burner axis or feed axis configured as a tangent to the ring space can advantageously lie tangential to the ring space at a distance, whereby the distance corresponds to the average ring radius. The "average ring radius" essentially corresponds to the arithmetic mean of the greatest as well as the smallest radius of the ring space relative to the axis of the ring space or to the main burner axis, if the ring space is disposed coaxial to the main burner axis. If the hot gas feed has a smaller diameter than the thickness of the ring space, whereby "thickness" mathematically means the difference between the smallest and the greatest radius of the ring space, the distance between the pre-burner axis or the feed axis can also be greater or smaller than the average ring radius, as is immediately evident. In this regard, a straight line that runs on a surface of the hot gas feed can be configured as a tangent to an outer surface of the ring space, so that the hot gas feed makes a constant transition into a surface of the ring space, at least at one point, and there specifically does not form an edge at which tear of the flow can take place.

It is understood that the term "lie tangential" is specifically not defined in the strict mathematical sense, whereby an axis that lies tangential to the ring space would have to mathematically touch the ring space at its greatest radius. As explained above, with regard to the greatest radius of the ring space, a tangential axis is understood as a secant, whereby the average radius defined above or the full circle formed by the average radius can form a tangential arrangement with an axis also in the mathematical sense. It should be emphasized that also in connection with the average radius, an axis can be not only a tangent or secant but also a passant. In particular, the term "lie tangential" should be interpreted as non-radial and non-axial.

The average ring radius is preferably disposed coaxial to the main burner axis, so that the mixture of hot gas and fuel can be configured to be particularly homogeneous.

Alternatively or cumulatively to the above characteristics, in order to accomplish the task stated initially, a method for operation of an axial piston motor having at least one main burner and having at least one pre-burner is proposed, whereby an exhaust gas stream of the pre-burner is mixed into a main fuel stream of the main burner, and whereby the method is characterized in that the exhaust gas stream of the pre-burner is guided tangentially from a ring space into the main nozzle space.

As has already been explained above, in this way particularly low-pulse flow of the exhaust gas into the ring space or into the main nozzle space is achieved, insofar as the exhaust gas that is flowing in can be uniformly distributed in the entire ring space and can mix homogeneously with the fuel found there, the main fuel stream. Pulse-affected deflection of the exhaust gas stream as it flows into the ring space or into the main nozzle space can lead to dead areas and tears in flow, under some circumstances, whereby soot formation can occur there due to lack of good mixing.

As is immediately evident, the term "dead area" is not exclusively reserved for flows in liquid media, but rather also refers to swirled regions and disruptions in the flow progression of gaseous media.

Furthermore, the method explained above can be improved to the effect that the exhaust gas stream of the pre-burner is guided into the main nozzle space at a distance from an axis of symmetry of the ring space, and that the distance corresponds to an average ring radius of the ring space. This further embodiment also leads, as described above, to uniform introduction and to good mixing of the exhaust gas with the main fuel stream, because a uniform transition or a uniform flow from the hot gas feed into the ring space is made possible. Also, this embodiment of the method makes it possible to configure the largest possible flow cross-section in the hot gas feed, without producing flows in the ring space that hinder mixing, because surface disruptions, such as those due to edges or corners, for example, can be minimized by means of this method.

Alternatively or cumulatively, the task indicated above is accomplished by an axial piston motor having at least one main burner that has at least one main combustion space as well as at least one main nozzle space, and having at least one pre-burner that has at least one pre-combustion space as well as at least one pre-nozzle space, whereby the pre-combustion space is connected with the pre-nozzle space by way of at least one hot gas feed, and whereby the axial piston motor is characterized in that a ring nozzle for hot gas feed into the main nozzle space is provided on the pre-burner side of the main nozzle space. Such a ring nozzle also advantageously contributes to homogenization of the mixture of hot gas and fuel, so that the latter can be better developed or prepared.

Alternatively or cumulatively, the task indicated above is accomplished by an axial piston motor having at least one main burner that has at least one main combustion space as well as at least one main nozzle space, and having at least one pre-burner that has at least one pre-combustion space as well as at least one pre-nozzle space, whereby the pre-combustion space is connected with the main nozzle space by way of at least one hot gas feed, and whereby the axial piston motor is characterized in that the main burner has a ring nozzle on the main nozzle space side of a main mixing tube. While the ring nozzle mentioned above is used for rapid mixing of the hot gas with the fuel, and thus heat transport and material transport are advantageously influenced, the ring nozzle that is provided in an advantageous embodiment for feed of a main air stream into the main mixing tube serves for rapid material transport and for rapid mixing in of the air that is introduced. From this, rapid combustion of the previously treated fuel occurs, at minimal production of emissions, because on the one hand, low-oxygen combustion zones and thereby soot are avoided, and on the other hand, little reaction time remains for the formation of nitric oxides.

Preferably, the ring nozzle is disposed coaxial to its main burner axis and/or coaxial to a main injection direction of the main nozzle, which accordingly leads to extremely homogeneous flame management.

In a further advantageous embodiment of the axial piston motor, the ring nozzle has at least one conically configured mantle surface with a cone angle of less than 45°. The flow, which is guided into the main mixing tube at an acute angle, for example that of the main air stream, advantageously leads to good mixing of the two gas streams that are brought together, without dead areas forming. Consequently, this embodiment of the ring nozzle offers a further possibility for preventing soot formation.

The term "conically configured mantle surface" means a surface of the ring nozzle along which the gas injected through the ring nozzle flows. Furthermore, in this connection, a surface that is only configured partially conically is meant by this, whereby the nozzle generally does not necessarily have to describe a complete cone, but rather also has a truncated cone as the gas-conducting surface. The "cone angle" is consequently the angle enclosed by a straight line that runs on the cone surface and the axis of symmetry of the cone. It is furthermore understood that two different surfaces of the ring nozzle can be configured conically, but with different cone angles.

Alternatively or cumulatively to the above characteristics of the invention, in order to accomplish the task stated initially, an axial piston motor having at least one main burner that has at least one main combustion space as well as at least one main nozzle space, and having at least one pre-burner that has at least one pre-combustion space as well as at least one pre-nozzle space, is proposed, whereby the pre-combustion space is connected with the main nozzle space by way of at least one hot gas feed, and whereby the axial piston motor is characterized in that the pre-combustion space and/or the pre-nozzle space has an insulation on an outer wall. The ring space described above can also have a corresponding insulation.

This insulation, which can advantageously be provided also on an inside outer wall of the spaces or combustion spaces indicated above, can contribute to minimizing wall heat losses and thermal degrees of effect losses connected with these wall heat losses. It is immediately evident that by means of this measure, the total degree of effectiveness of the axial piston motor can also be optimized, while increasing the thermal degree of effectiveness.

In axial piston motors, insulation of a combustion space wall by means of ceramic layers, as disclosed, for example, in WO 2009/062473, is already known. The use of insulation in a pre-combustion space and/or in a pre-nozzle space, however, offers clear advantages on contrast to use in a main combustion space according to the state of the art, because steady-state conditions can be adjusted in a pre-burner, to a great extent, with uniform flow velocities, if load regulation takes place by way of the main burner. Thus, the insulation used can be coordinated with the heat flows that occur, in more targeted manner, thereby making it possible to achieve greater security against mechanical failure.

Accordingly, when using a two-stage or even multi-stage control of a pre-burner, in other words particularly in the case of load control by way of the pre-burner, insulation can surprisingly bring advantages for an axial piston motor, despite the non-steady-state conditions. In this connection, it has been shown in practical experiments that insulation of the pre-burner can suppress any non-steady state behavior it might demonstrate, to a great extent, and thereby a stabilized flame temperature but also stabilized emission behavior of the pre-burner can be achieved. These advantages, implemented in a pre-burner, gain particular importance if hot gas having a uniform quality must be fed to a subsequent main burner. On the one hand, the main burner can also be operated in more stable ranges because of the stable operation of the pre-burner, and on the other hand, regulation of the main burner becomes far simpler, because some of the interference factors that act on regulation of the main burner, such as those caused by the non-steady-state operating behavior of the pre-burner, are eliminated. Thus, ultimately simple control circuits can be used, because it is possible to do without cascade controls or controls with complex status spaces.

It is particularly advantageous for an axial piston motor if the insulation is configured to be ceramic. Thus, the insulation is promoted by particularly low heat conductivity. As is furthermore evident, alternative materials can also be used as insulation, as long as the melt temperature of the material used is higher than the combustion space temperature or nozzle space temperature, in each instance. Thus, for example, a high-alloy austenitic steel offers heat conductivity that is reduced by about two-thirds, as compared with non-alloyed steel. Also, in this connection, further alternative materials, for example titanium, are possible.

Alternative or cumulatively to the above characteristics of the invention, in order to accomplish the task stated initially, an axial piston motor having at least one fuel nozzle and having at least one fuel line connected with the fuel nozzle is proposed, which motor is characterized in that the fuel line is configured at least in part as a heat-absorbing chamber of at least one heat exchanger, upstream from the fuel nozzle. This embodiment offers advantages for an axial piston motor insofar as a fuel injection by means of the fuel nozzle is heated before being injected, and thus the formation of a fuel/air mixture within the axial piston motor or within a combustion space of the axial piston motor can take place clearly more homogeneously and more rapidly, which can manifest itself in much more low-emission combustion than would be the case in the event of injection with cold fuel. The heat exchanger used for this purpose can have the said heat-absorbing chamber and a further heat-emitting chamber, through which a hot fluid is passed to heat the fuel, to achieve this purpose.

Also, alternatively or cumulatively, the fuel line itself can be laid around or through a hot component of the axial piston motor.

However, the use of a heat exchanger particularly offers advantages if a fluid is used for heating the fuel, which fluid has a heat stream that leads out of the axial piston motor applied to it in any case, such as an exhaust gas.

In connection with fuel heating by means of heat transfer, it is accordingly advantageous if at least one heat-emitting chamber of the heat exchanger is configured, at least in part, as an exhaust gas line, as a coolant line and/or as a lubricant line. This method of procedure makes it possible, as is immediately evident, to make available an axial piston motor that not only has stable and low-emission combustion, but also has an increased level of effectiveness, in that energy that exits from the axial piston motor is recovered and coupled back into the circulation of the axial piston motor.

In order to accomplish the task stated initially alternatively or cumulatively to the above characteristics, a method for operation of an axial piston motor having at least one fuel nozzle and having at least one fuel line is furthermore accordingly proposed, whereby the fuel line leads a fuel stream to the fuel nozzle, and the method is characterized in that the fuel stream is heated upstream from this fuel nozzle.

Furthermore, alternatively or cumulatively to the other characteristics of the invention, and in order to accomplish the task stated initially, a method for operation of an axial piston motor having at least one fuel nozzle and at least one fuel line is proposed, whereby the fuel line feeds a fuel stream to the fuel nozzle, and the method is characterized in that the fuel stream is heated in the fuel line, upstream from the fuel nozzle, by means of a fluid that flows outside of the fuel line. In this connection, the fluid heating the fuel can additionally be an exhaust gas stream, a coolant stream and/or a lubricant stream of the axial piston motor.

Furthermore, alternatively or cumulatively to the above characteristics, and in order to accomplish the task stated initially, a method for operation of an axial piston motor having at least one fuel nozzle and having at least one fuel line is proposed, in which the fuel line feeds a fuel stream to the fuel nozzle, and which is characterized in that the fuel stream is heated in the fuel line, upstream from the fuel nozzle, by means of a heat flow of the axial piston motor.

The above embodiments for heating the fuel or of the method for heating a fuel offer the advantage, as has already been explained above, as well, on the one hand, of raising the fuel to a temperature level, even before injection, that leads to the result, during combustion of the fuel with air, that soot particles but also nitric oxides can be reduced, on the basis of the hot and rapid combustion.

Also, the above methods for heating the fuel offer the possibility of recirculating non-used waste heat of the axial piston motor back into the circulation process of the axial piston motor, and thereby to raise the thermodynamic level of effectiveness of the axial piston motor.

In the previously indicated case of heating of the fuel by means of a heat stream, the heat stream can, in particular, be derived, directly and/or indirectly, from a friction power, from a waste heat stream and/or from an exhaust gas stream of the axial piston motor. The friction power that occurs between moving components of a power machine is conducted away by way of a lubricant stream, in the predominant embodiments of internal combustion engine drives, whereby this lubricant stream is passed through a heat exchanger and the heat of the lubricant stream that is produced by friction is dissipated into the environment. In this regard, use of the lubricant stream that is present in any event and of the heat exchanger in this lubricant stream that is present in any event, for heating the fuel, offers particular advantages, because it is possible to do without additional effort and expense with regard to the components used and the construction space used.

At this point, "waste heat stream" means the sum of all the other heat streams of a power machine, which impacts in radiation energy at the surface of the power machine or also by means of heating of the coolant circuit. In view of a coolant circuit that is also present, it is particularly simple and advantageous, in this case as well, to heat a fuel line by way of a heat exchanger, by means of the coolant circuit or the cooling water circuit.

In addition or alternatively to the heat or fluid circuit explained above, use of the exhaust gas stream for heating the fuel is also a possibility, whereby an additional heat exchanger can be integrated into the exhaust gas train, particularly if a heat exchanger is already provided for heating the air that is fed in.

The exhaust gas stream can preferably be used for heating the fuel, because the exhaust gas of a power machine usually demonstrates particularly high temperatures, in other words a particularly high temperature gradient relative to the fuel. However, the use of a single material stream or heat stream for heating the fuel does not preclude use of the additional material streams or heat streams. Accordingly, a combination of all the stated possibilities for heating a fuel can also be used, insofar as the fuel is first pre-heated by oil or water circuits and only subsequently heated to the desired temperature by means of the exhaust gas.

Advantageously for a method for operation of an axial piston motor, the fuel stream can be heated, for fuel heating, to a temperature greater than 700° C., more preferably to a temperature greater than 900° C., even more preferably to a temperature greater than 1100° C. In this manner, it is ensured that the fuel is not only present in gaseous form, but also molecules of the fuel are already broken down within the fuel line, for a better reaction with the combustion air.

In order to accomplish the task stated initially, alternatively or cumulatively to the above characteristics of the invention, an axial piston motor having a heat exchanger, which has an exhaust gas stream and a working gas stream separate from the exhaust gas stream, which transfers heat from the exhaust gas stream to the working gas stream, which has a longitudinal axis, and which has a working gas chamber that runs along the longitudinal axis, can be characterized in that a housing, the working gas chamber and/or the exhaust gas chamber of the heat exchanger are mechanically coupled with one another, rigidly at a first end of their longitudinal expanse, and elastically at a second end of their longitudinal expanse. Furthermore, the elastic coupling can have a metallic membrane.

An advantage of the aforementioned embodiment of an axial piston motor and of a heat exchanger used with this axial piston motor results from the particular ability of the heat exchanger to allow heat exchange of the two stated fluids, in operationally reliable and gastight manner, even at a particularly high temperature level of the exhaust gas stream or in the event of a very great temperature difference between the exhaust gas stream and the working gas stream. The high temperature level, as expected, brings about non-uniform longitudinal expansion in the heat exchanger, whereby the non-uniform heat expansion can lead to particularly great heat stresses in the housing or in the two chambers of the heat exchanger. These heat stresses, in the worst case scenario, lead to failure of the heat exchanger, which leads to failure of the axial piston motor.

The chambers of the heat exchanger, which are rigidly coupled, on the one hand, or a chamber of the heat exchanger rigidly coupled with the housing, lead to different longitudinal expansions of the components, in each instance, at the other end, in each instance, the second end of the longitudinal expanse of the heat exchanger. At this second end of the longitudinal expanse of the heat exchanger, the previously mentioned elastic membrane is provided, which seals the working gas chamber, the exhaust gas chamber and/or the housing of the heat exchanger relative to one another and relative to the environment, in gastight manner, and, because of its elastic properties, allows mechanical length equalization of the components coupled with one another, without the occurrence of impermissibly great heat stresses.

It is understood that an elastic coupling by way of a membrane can be used at the first end of the longitudinal expanse of the heat exchanger, even in the case of a heat exchanger that is not produced from different materials and thus different longitudinal expansions within the heat exchanger are not expected, at first. A non-uniform temperature distribution in the heat exchanger can therefore require advantageous use of a membrane for elastic coupling.

Preferably, the elastic coupling is provided on a cold side of the heat exchanger, because then—particularly at high temperatures—a negative influence of the heat on the elastic coupling can be minimized.

It is furthermore understood that the characteristics of the solutions described above or in the claims can also be combined, if necessary, in order to be able to implement the advantages cumulatively, accordingly.

Figure 2:
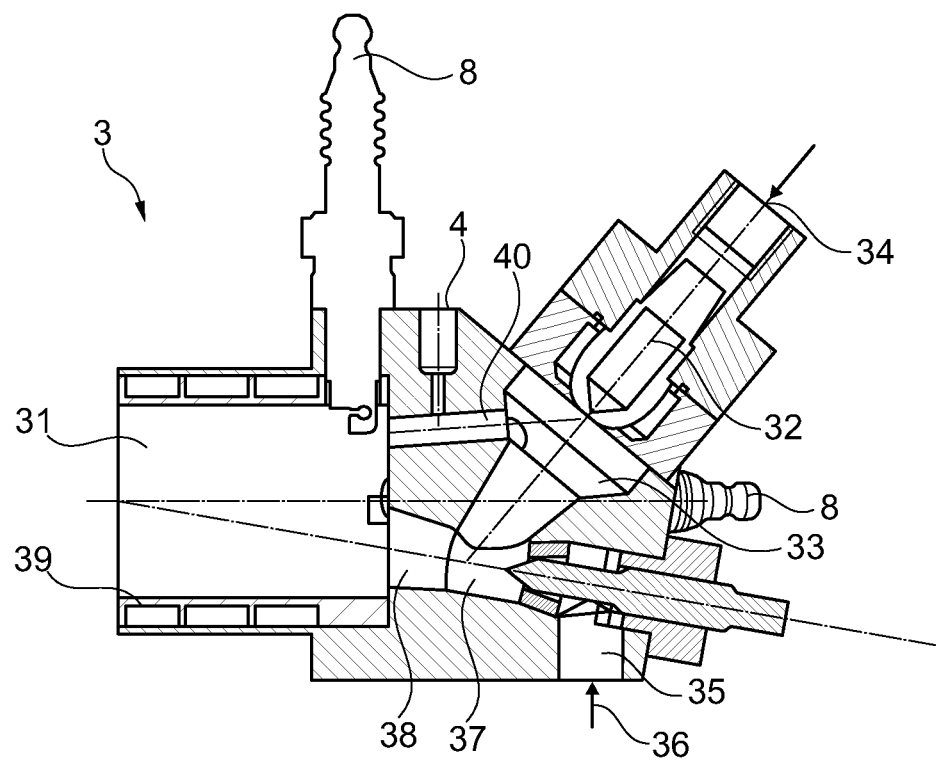
Figure 3:
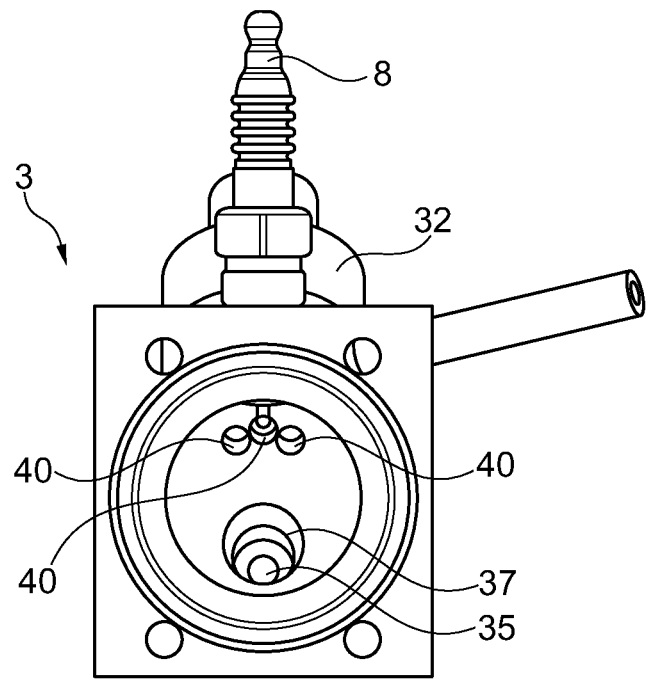
Figure 4:
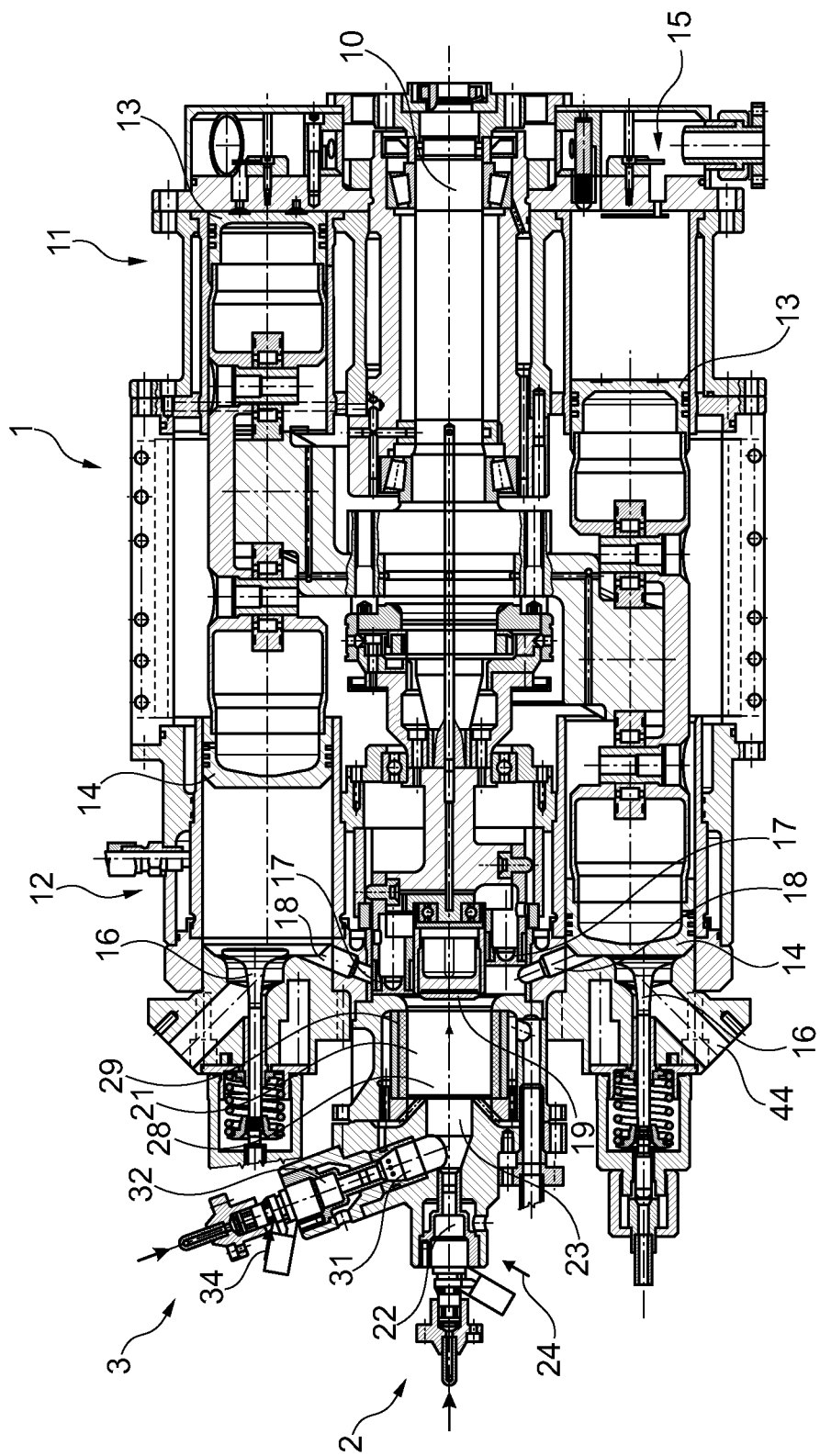
Figure 5:
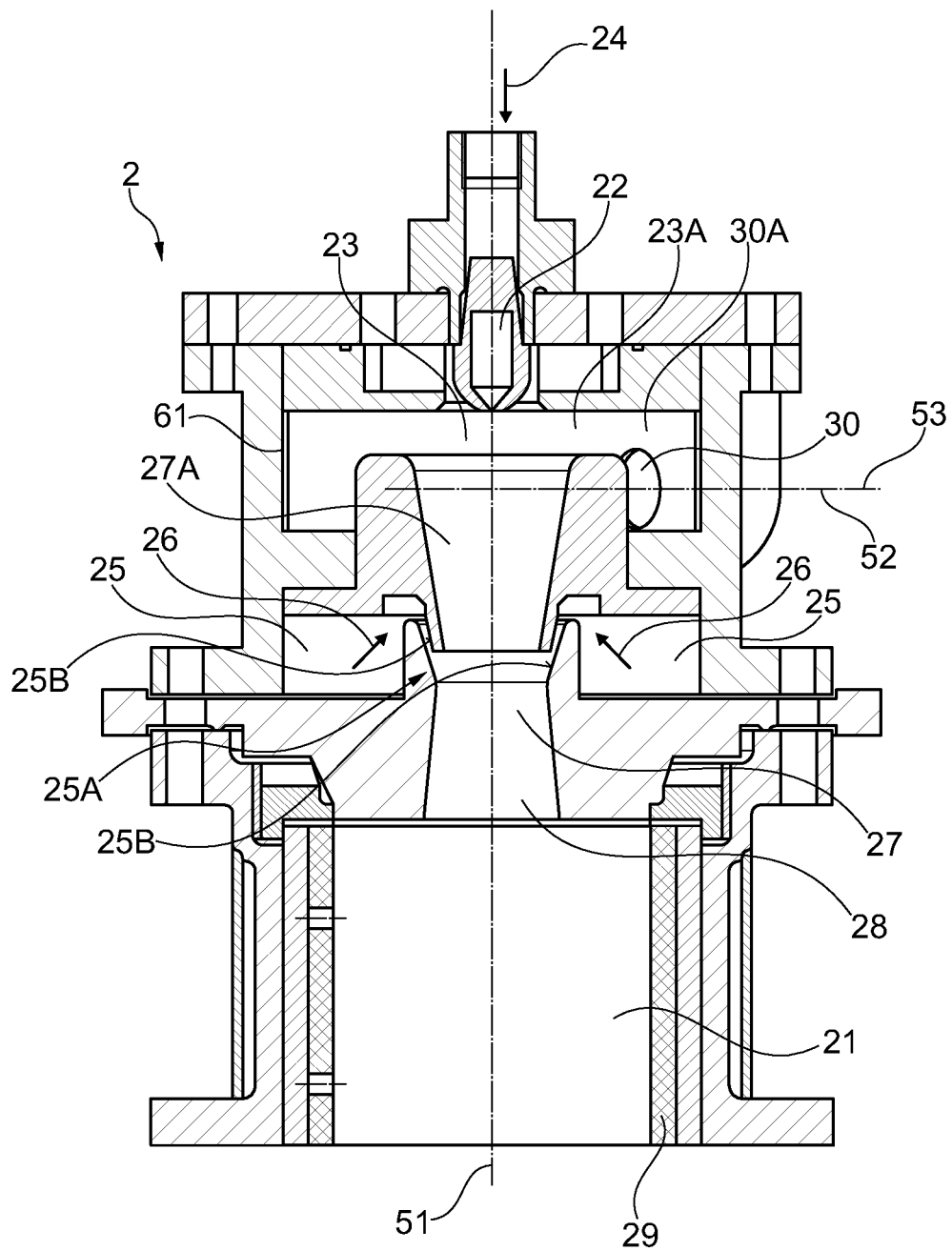
Figure 6:
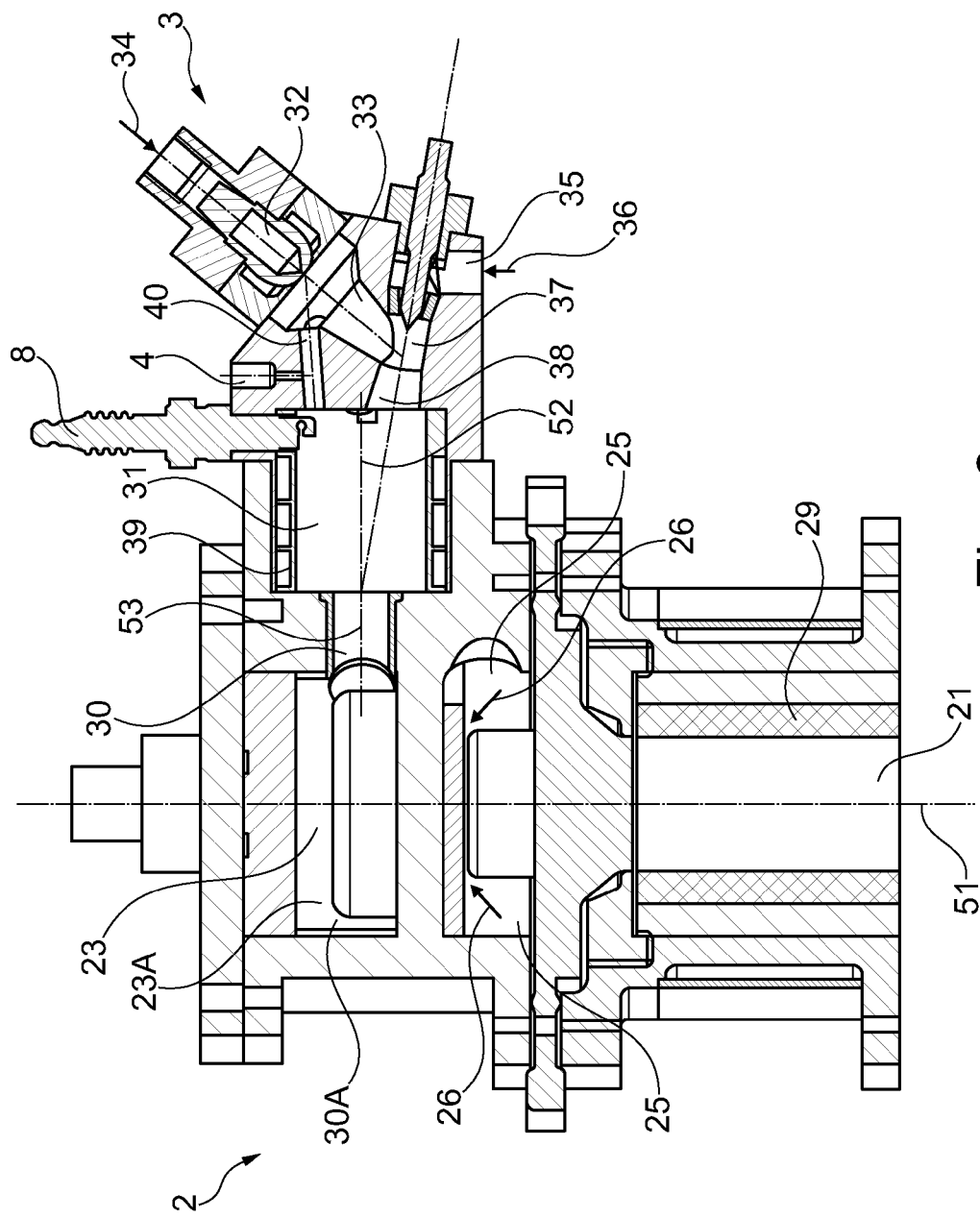
Figure 7:
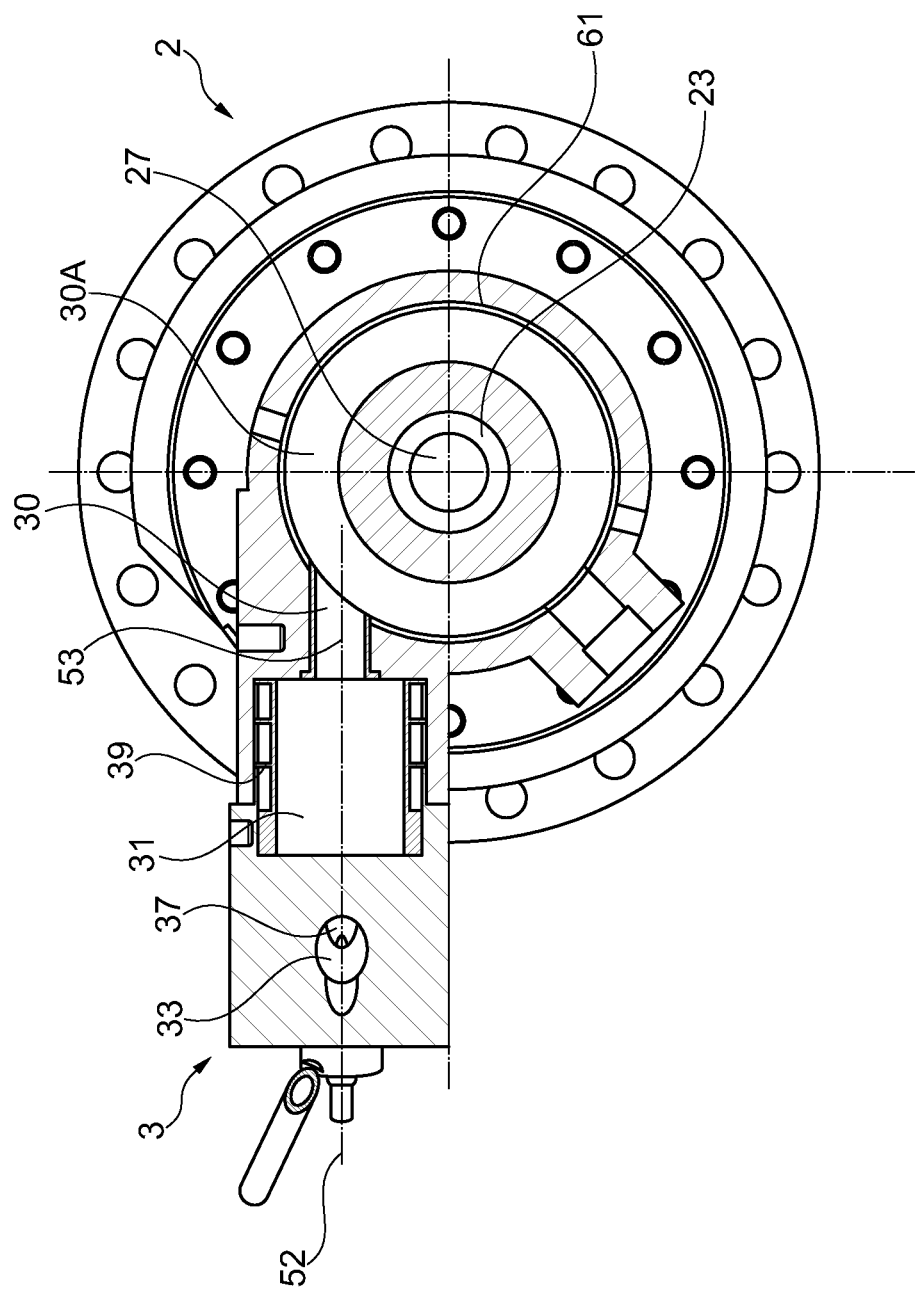
Figure 8:
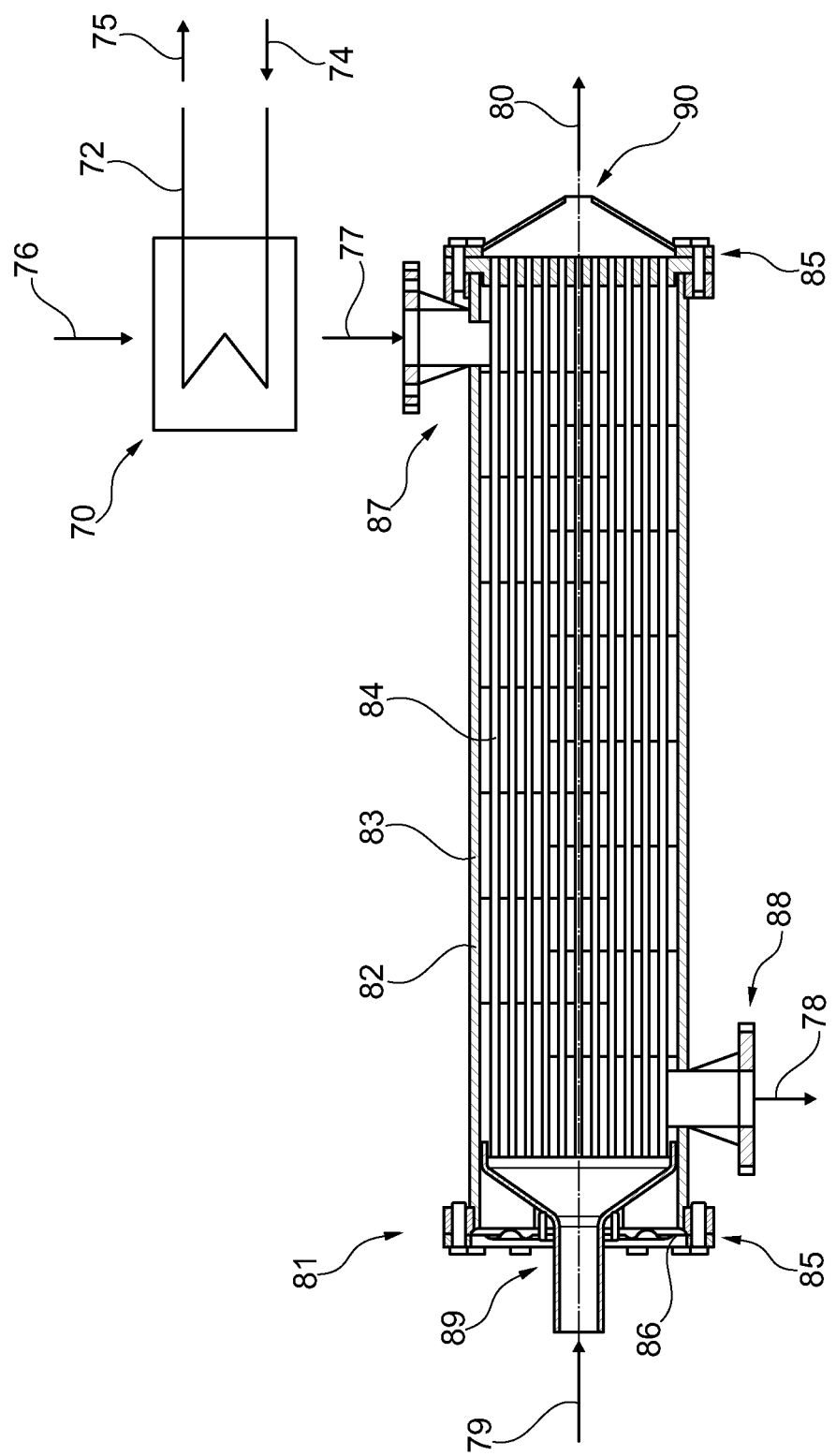
Figure 9:
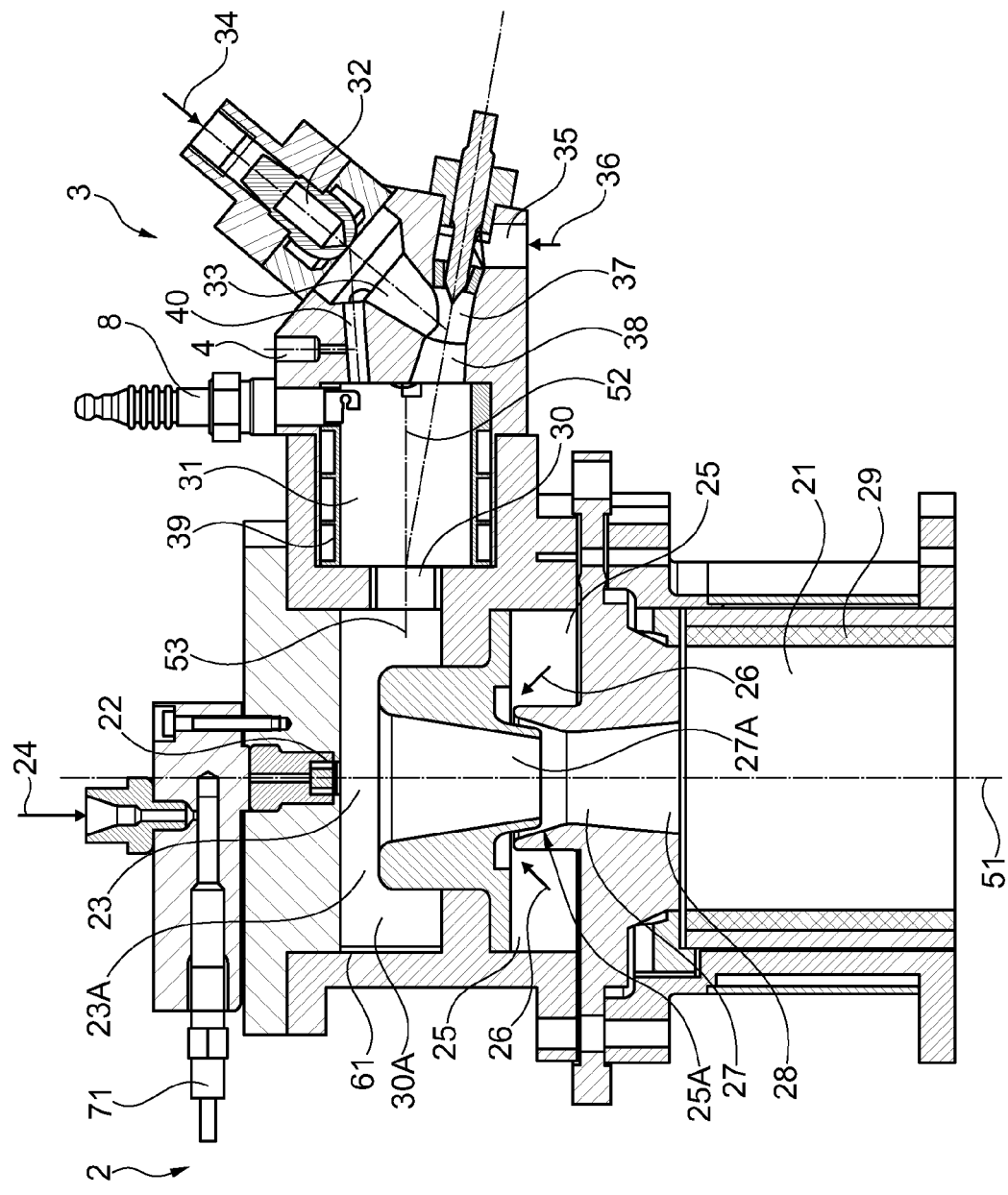
Figure 10:
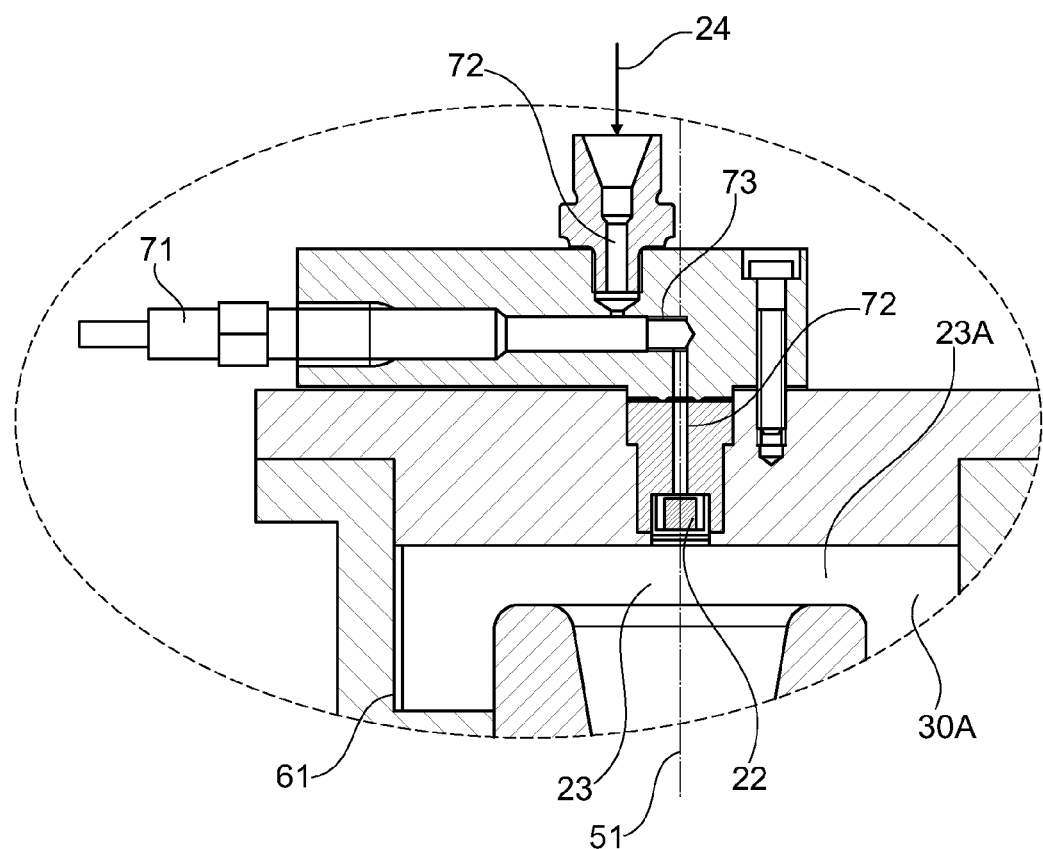

Additional advantages, objectives and properties of the present invention will be explained using the following description of the attached drawings. These show:

FIG. 1 a schematic sectional representation of a burner for an axial piston motor having a main burner and a pre-burner;

FIG. 2 a schematic sectional representation of the pre-burner of an axial piston motor according to FIG. 1;

FIG. 3 a top view of a pre-burner according to FIGS. 1 and 2;

FIG. 4 a schematic sectional view of an axial piston motor having a burner according to the state of the art, to explain the technological background, whereby modules that have the same effect as in the burner according to FIGS. 1 to 3 are also numbered the same way;

FIG. 5 a schematic sectional representation of the main burner of an axial piston motor, having a ring space as the main nozzle space;

FIG. 6 a further schematic sectional representation of the main burner according to FIG. 5 with a pre-burner in a sectional representation;

FIG. 7 a top view of the arrangement of main burner and pre-burner shown in FIG. 6;

FIG. 8 a heat exchanger in a sectional representation, with a fuel heating system for an axial piston motor;

FIG. 9 the arrangement of main burner and pre-burner according to FIG. 6, with a further fuel heating system; and FIG. 10 a detailed representation of the fuel heating system according to FIG. 9.

The burner for an axial piston motor 1 shown in FIGS. 1 to 3 has a main burner 2 and a pre-burner 3.

The pre-burner 3 connected with a main nozzle space 23 of the main burner 2 by way of a hot gas feed 30 furthermore has a pre-air line 35 and a pre-nozzle 32 for the formation of a fuel/air mixture. In this connection, the pre-air line 35 opens into a pre-mixing tube 37, whereby the pre-air line 35 conveys a pre-air stream 36 into this pre-mixing tube 37.

Furthermore, a pre-nozzle space 33 is assigned to the pre-mixing tube 37, into which space a pre-fuel stream 34 is introduced by way of the pre-nozzle 32. The fuel/air mixture made available in the pre-mixing tube 37 is combusted in essentially isobar manner during operation of the axial piston motor 1, at the exit of this pre-mixing tube 37, and passed to a pre-combustion space 31.

Combustion of the fuel/air mixture takes place, in this connection, in a pre-combustion zone 38, at a transition between the pre-mixing tube 37 and the pre-combustion space 31, whereby the pre-combustion space 31 is flooded with hot exhaust gas. The exhaust gas produced in the pre-burner 3 is preferably a stoichiometric exhaust gas, which is passed to the main burner 2 after entry into the pre-combustion space 31, by way of the hot gas feed 30.

The pre-combustion space 31, which is furthermore delimited and cooled by way of a pre-combustion space wall 39, preferably has a cylindrical structure, whereby the hot gas feed 30 is disposed concentric to the pre-combustion space 31 in this embodiment.

The cylindrical pre-combustion space wall 39 has additional hollow chambers on its side facing away from the pre-combustion space 31, which bring about additional insulation with regard to the surroundings of the pre-burner 3. For this purpose, the cavity provided on the pre-combustion space wall 39 can be flooded with air, exhaust gas, the pre-air stream 36, or with cooling water. Passing the pre-air stream 36 through the cavity of the pre-combustion space wall 39 additionally brings about recovery and recirculation of the heat given off at the pre-combustion space wall 39, which heat is passed back to the pre-burner 3 by way of the pre-air line 35.

In contrast to this, the pre-mixing tube 37, and, in particular, the pre-combustion zone 38 are disposed outside of an axis of symmetry of the pre-combustion space 31. In this embodiment, an axis of symmetry or rotation of the pre-mixing tube 37 intersects the axis of rotation of the pre-combustion space 31 within the hot gas feed 30.

This asymmetrical arrangement between pre-mixing tube 37 and pre-combustion space 31 has the result, during operation of the pre-burner 3, that circulation of the exhaust gas that is produced comes about in such a manner that an exhaust gas stream always impacts on an entry of an auxiliary hot gas feed 40. This auxiliary hot gas feed 40 in turn is connected with the pre-nozzle space 33 in the embodiment described, and thereby produces internal exhaust gas recirculation within the pre-burner 3.

The internal exhaust gas recirculation by the auxiliary hot gas feed furthermore brings about at least heating and preferably evaporation of the pre-fuel stream 34 within the pre-nozzle space 33, as long as the exhaust gas has a sufficiently high temperature.

As is particularly shown in FIG. 3, the pre-burner 3 has three individual auxiliary hot gas feeds 40 between the pre-combustion space 31 and the pre-nozzle space 33. These auxiliary hot gas feeds 40 are disposed symmetrical to the plane of the section according to FIG. 2, whereby the increased number of auxiliary gas feeds 40 ensure a greater exhaust gas stream.

In this connection, it is also possible that the additional auxiliary hot gas feeds 40 are also structured to be controllable, so that an exhaust gas stream fed to the pre-nozzle space 33 can be regulated in terms of its amount or its mass. The auxiliary hot gas sensor 4, which in this case can be a temperature or pressure sensor, but also a lambda sensor for measuring the exhaust gas composition, is used for these regulation purposes, if applicable.

If a sufficiently high temperature of the exhaust gas is present, for example a temperature of 700° C., the recirculated exhaust gas in the pre-nozzle space 33 brings about not only atomization and evaporation of the pre-fuel stream 34, but also first dissociation processes or pre-reactions within the pre-fuel stream 34. It should be emphasized, at this point, that "pre-reaction" means any reaction of the fuel, particularly also reactions without the participation of oxygen.

This embodiment of the pre-burner 3 therefore results in particularly efficient, hot, and rapid combustion in the pre-combustion zone 38, thereby inhibiting soot formation, in particular, but also nitric oxide formation. Soot formation is inhibited, by this embodiment of combustion, by means of the very high combustion temperature.

High temperatures during combustion of a fuel/air mixture could, however, bring about very high concentrations of nitric oxides, if the Zeldovich mechanism goes into effect. For this reason, reduced emission of nitric oxides is not expected by a person skilled in the art, at first, despite particularly hot combustion. However, the thermal treatment of the fuel in the pre-nozzle space 33, but also in the main nozzle space 23, apparently advantageously brings about molecular decomposition of the fuel, already starting at that point, and therefore apparently also an increased formation of radicals, which clearly accelerate the combustion reactions and thereby inhibit the formation of nitric oxides.

The reaction velocities for most combustion processes are known to depend not only on the temperature but also on the pressure during combustion. Thus, a reaction of the fuel components with air takes place more rapidly by many orders of magnitude, if the combustion temperature or the combustion pressure is higher, as is implemented in the embodiment explained above.

After the treatment of the fuel also explained above, little time remains for the formation of thermal nitric oxide during combustion at a high temperature level if the combustion educts, in other words the air and the fuel, are sufficiently pre-heated, and a chain start as well as a chain branching of the combustion already set in immediately before mixing in of the fuel into the combustion air, in other words ahead of the actual reaction zone. In this connection, it is particularly advantageous if the fuel and/or the combustion air are pre-heated up to a temperature above which specifically no thermal nitric oxide is formed or equilibrium reactions for the formation of thermal nitric oxide according to the Zeldovich mechanism specifically do not demonstrate any noteworthy conversion.

Therefore, particularly preferably, a pre-fuel stream 34 in the pre-nozzle space 33, but also a main fuel stream 24 in the main nozzle space 23 is pre-heated to a temperature of around 1000° C., below which a noteworthy conversion specifically does not set in. It is immediately evident that the fuel in the pre-nozzle space 33 or in the main nozzle space 23 can also have a higher temperature, if the temperature drops far below 1000° C. during mixing of the fuel in the pre-mixing tube 37 or a main mixing tube 27 of the main burner 2, because of the combustion air, which is cold relative to the fuel.

For monitoring and regulation processes within the pre-burner 3, the pre-burner 3 furthermore has a spark plug 8 as well as an auxiliary hot gas sensor 4 as well as a hot gas sensor 5. While the spark plug 8, can be used, as is immediately evident, for a starting process of the pre-burner 3, it is possible to measure either the temperature, the pressure, or the composition of the exhaust gas conveyed in the auxiliary hot gas feed 40, by way of the auxiliary hot gas sensor 4. In the same manner, the hot gas sensor 5 can also be used for monitoring the exhaust gas fed to the main burner 3 by way of the hot gas feed 30.

In a manner similar to how exhaust gas in the pre-burner 3 is fed to the pre-nozzle space 33, treatment of the main fuel stream 24 injected by way of a main nozzle 22 also takes place in the main burner 2, as indicated above.

As is immediately evident, in this connection the pre-burner 3 works as an external hot gas generator for the main burner 2, which itself does not have any internal exhaust gas recirculation in this exemplary embodiment.

The main nozzle space 23, contrary to the pre-nozzle space 33, is disposed on an axis with the main mixing tube 27 and a main combustion space 21. An asymmetrical arrangement between the main nozzle space 23 and the main combustion space 21 or the main mixing tube 27 is possible. The combustion air fed to the main mixing tube 27 by way of a main air stream 26 flows laterally into the main mixing tube 27 by way of a ring channel, and there reacts in a main combustion zone 28, with the release of heat and in isobar manner, in order to thereupon flow, as exhaust gas, into the main combustion space 21 at first. The main air stream 26 is conveyed to the main mixing tube 27 of the main burner 2 by way of a main air line 25, whereby the main air line 25, together with the pre-air line 35, is connected with a compressor stage 11, not shown, of the axial piston motor 1, as it is known according to the state of the art and shown in FIG. 4.

In the main burner 2, as well, sensors for a control unit are provided for the purpose of regulating combustion and power. Thus, a nozzle space sensor 6 is provided on the main nozzle space 23, by means of which the temperature, the pressure and/or the exhaust gas composition within the main nozzle space 21 can be detected. In addition, the main mixing tube 27 has a mixing tube sensor 7 that can determine the composition, the temperature, in the main combustion zone 28 or, if necessary, the pressure in the main combustion zone 28, and pass it on to a control unit.

It is immediately evident that a cavity of the pre-combustion space 39 can also be used for heating the pre-fuel stream 34 or the main fuel stream 24. If the fuel is passed through the cavity of the pre-combustion space wall, it already takes on heat energy before being injected into the pre-nozzle space 33 or the main nozzle space 23, which energy positively influences spray formation or droplet decomposition during injection, in that mixture formation energy is already supplied to the fuel before a mixing process with air. The pre-fuel stream 34 or the main fuel stream 24 can also already be heated, under certain operating conditions such as full load of the axial piston motor 1, in such a manner that it makes a transition in a fuel line 41, or, instead, because of the existing pressure drop, during injection into the pre-nozzle space 33 or main nozzle space 23, into the gaseous aggregate state. As is immediately evident, the embodiments explained above, relating to a pre-combustion space wall 39, can also be applied to a main combustion space wall 29.

In the burner arrangement of the axial piston motor 1 described using FIGS. 1 to 3, furthermore a combustion method is applied, in such a manner that after mixing of the pre-fuel stream 34 with the pre-air stream 36, no further feed of combustion air takes place, until the mixture of main fuel stream 24 and hot gas or exhaust gas of the pre-burner 3, produced in the main nozzle space 23, is fed to the main mixing tube 27. Mixing in of the main air stream 26 takes place, in contrast to the state of the art, in or directly ahead of the main mixing tube 27, and not just in the main combustion chamber 21. The one-stage combustion applied in this connection, particularly in the pre-burner 3, brings about good regulatability of the residual oxygen content, which is adjusted to be close to zero. Thus, treatment of the fuel introduced with the main fuel stream 24 takes place in the main nozzle space 23, without oxidation already taking place. Consequently, this method management, without residual oxygen in the hot gas that is fed in, brings about the result that production of emissions, for example the formation of nitric oxides, is inhibited.

An embodiment of an axial piston motor 1 according to the state of the art, with a compressor stage 11, will be described below to explain the technological background, using FIG. 4.

The compressor stage 11, with compressor pistons 13 disposed parallel to one another, draws air in out of the environment, by way of a pre-compressor control drive 15, and conveys this air, after it has been compressed, into an air line, not shown, which opens at least into the main air line 25 and into the pre-air line 35 on the burner according to FIG. 1.

The axial piston motor 1 according to FIG. 4 furthermore has a main burner 2 and a pre-burner 3 according to the state of the art, which fire or drive an expander stage 12 with expander pistons 14, by way of an exhaust gas produced in the main combustion space 21, whereby at this point, the burner according to FIGS. 1 to 3 can also be directly applied. For this purpose, the exhaust gas exiting from the main combustion space 21 is passed on to one of the expander pistons 14, in each instance, by way of a shot channel 18, in each instance, which piston gives off power to a power take-off shaft 10 of the axial piston motor 1, with positive piston work. The relaxed exhaust gas is conducted into an exhaust gas line 44, by way of expander outlet valves 16, after it has been fed to the expander pistons 14 by way of expander inlet valves 17.

In contrast to the embodiment of the main burner 2 according to FIG. 1, the main burner 2 according to FIG. 4 does not have a Laval nozzle 9, which can also be eliminated for use in the axial piston motor 1, but rather, it has a combustion space bottom 19, onto which the exhaust gas flowing out of the main burner 2 impacts, or by means of which the exhaust gas is deflected into the shot channels 18.

At this point, a further advantage of the pre-burner 3 and main burner 2 according to the invention and according to FIG. 1 becomes evident, because that embodiment brings about fewer pulsations within the two partial burners because of their geometrical configuration. Also, a main burner 2 according to the state of the art does not have a main mixing tube 27, in which the main air stream 26 is fed into the main fuel stream 24. The axial piston motor 1 shown in FIG. 4 instead has a main combustion zone 28 that already projects greatly into the main combustion space 21. A significant difference from the embodiment of the axial piston motor 1 according to the invention, however, lies in the pre-combustion chamber 3, which does not have any auxiliary hot gas feed 40 and therefore also no stabilized flame formation in the pre-burner 3 in the state of the art.

The alternative embodiment of a main burner according to FIG. 5, in contrast to the embodiment described above, has a main nozzle space 23 that is surrounded by a ring space 30A. The hot gas feed 30 opens into this ring space 30A, whereby a feed axis 53 of this hot gas feed 30 intersects a main burner axis 51 at an angle of approximately 90° in the projection plane used in the representation of FIG. 5. At the same time, the main burner axis 51 is the axis of symmetry of the main combustion space 21, the main mixing tube 27, and the main nozzle space 23 that are shown, as well as of the ring space 30A. Similar to the ring space 30A, the main air line 25, which guides the main air stream 26, is also configured as a ring space shortly before entry into the main mixing tube 27. This embodiment of the ring-shaped main air line 25 also leads to homogeneous mixture formation within the main mixing tube 27, to the greatest possible extent, thereby resulting in uniform combustion in the main combustion zone 28.

The main combustion space wall 29 used to avoid wall heat losses is used, in corresponding manner of effect, also according to the present configuration of the main burner 2 in the ring space 30A. For this purpose, the ring space 30A has an insulation 61 affixed to an outer wall of the ring space 30A in cylinder shape. The insulation 61, just like the main combustion space wall 29, is made from a ceramic material and reduces heat conduction of the hot exhaust gas contained in the ring space 30A to the remainder of the housing of the main burner 2. The exhaust gas mixes with the main fuel stream 24 before entry into the main mixing tube 27, by way of a ring nozzle 23A; this stream is passed to the pre-nozzle space 23 by way of the main nozzle 22.

During operation of the main burner 2, the ring-shaped configuration of the main nozzle space 23 allows circulation of the exhaust gas fed by way of the hot gas feed 30, about the main burner axis 51, thereby preventing dead areas within the main nozzle space 23 or also within the hot gas feed 30, to a great extent, and thereby making it possible to suppress soot formation, at least soot formation resulting from mixing.

The feed line to the main mixing tube 27 is furthermore configured as a mixing nozzle 27A, in which the flow composed of the main fuel stream 24 and exhaust gas can be influenced once again before entry into the main mixing tube. The conical configuration shown therefore leads to acceleration of the gas flow and has a positive effect on the mixing behavior of the main fuel stream 24 with the exhaust gas, on the one hand, and on the other hand produces an ejector flow at a ring nozzle 25A, which flow promotes further mixing with a main air stream exiting from the ring nozzle 25A.

The ring nozzle 25A is disposed ahead of the mixing tube 27 and radially circumferential, in order to feed the treated fuel stream into the main air stream 26 uniformly. Two conically configured nozzle surfaces 25B of the ring nozzle 25A run into the mixing tube 27 at an acute angle, in this connection, whereby here, too, dead areas, for example caused by a tear in the flow, are avoided. The flat run-in angle of the ring surfaces 25B furthermore surprisingly promotes homogenization of the air that is blown in with the fuel stream, thereby avoiding emissions, on the basis of the rapid and homogeneous combustion. For an optimal configuration of the flow velocity present in the ring nozzle 25A, the two nozzle surfaces 25B of the ring nozzle 25A are structured with different cone angles.

The pre-burner 3 that precedes the hot gas feed 30, according to FIGS. 6 and 7, produces a stoichiometric exhaust gas, as was already true in the previous embodiments, and passes it tangentially, to the greatest possible extent, into the ring space 30A. In this embodiment, the pre-burner axis 52 and the hot gas feed axis 53 coincide, because the hot gas feed 30 is structured as a cylindrical tube, coaxial to the pre-burner 3 and to the pre-combustion space 31.

The tangential arrangement of the pre-burner 3 or of the hot gas feed 30 relative to the main nozzle space 23 brings about an induced flow—in a clockwise direction according to FIG. 7—that leads to homogeneous mixing of the main fuel stream 24 with the exhaust gas stream of the pre-burner, to the greatest possible extent. The same is also brought about, supplementally, by the ring nozzle 23A.

In this embodiment, the pre-combustion space 31 also has a pre-combustion space wall 39 that is configured in the manner of a ceramic, in order to avoid heat losses and to increase the degree of effectiveness of the axial piston motor 1. The pre-mixing tube 37 as well as the pre-combustion zone 38 are disposed at a very much smaller angle relative to the pre-burner axis 52, in contrast to the corresponding configuration in the main burner 2. This deviating arrangement promotes circulation within the projection plane according to FIG. 6, in contrast to the main burner 2, so that the exhaust gas exiting from the pre-combustion zone 38 impacts partly onto the auxiliary hot gas feed 40, and in this way can be passed to the pre-nozzle space 33. In or directly upstream from the pre-nozzle space 33, metering in of the known from the previous exemplary embodiments metering ins of the pre-fuel stream 34 and of the pre-air stream 36 takes place by way of the pre-nozzle 32, in each instance, and by way of the pre-air line 35.

In order to master the temperatures that occur at the axial piston motor 1, also within a heat exchanger 81, the heat exchanger 81 structured according to FIG. 8 has a metallic membrane 86 that connects the housing 82 or the exhaust gas chamber 83 mechanically and gastight with the working gas chamber 84, at one end of the longitudinal expanse of the heat exchanger 81. In the embodiment shown, the working gas chamber entry 89 passes through the membrane 86, which entry leads the working gas cold stream 79 into the heat exchanger 81. This working gas cold stream 79 takes on heat as it flows through the working gas chamber 84, from an exhaust gas intermediate stream 77 that is passed into the exhaust gas chamber 83. After the heat transfer has taken place, a working gas hot stream 80 exits from the heat exchanger 81 again at a working gas chamber exit 90, which stream is passed to the expander stage 12 of the axial piston motor 1 or to the main burner 2 and the pre-burner 3 during the further course of the process. The working gas cold stream 79, as already explained above, is taken from the expander stage 12 of the axial piston motor 1. Furthermore, the exhaust gas chamber 83 has an exhaust gas chamber entry 87, into which the relaxed exhaust gas intermediate stream 77, or—in another exemplary embodiment—the relaxed exhaust gas hot stream 76 enters directly, and an exhaust gas chamber exit 88, from which the relaxed and cooled exhaust gas cold stream 78 is passed off into the surroundings.

Before the exhaust gas intermediate stream 77 is fed to the heat exchanger 81, partial heat transfer in a fuel heat exchanger 70 already takes place to a fuel cold stream 74. The fuel cold stream 74, just like the working gas cold stream 79, takes up the heat made available by way of an exhaust gas hot stream 76, and, after conversion to a fuel hot stream 75, recovers it and passes it back to the axial piston motor 1. Without the use of a fuel heat exchanger 70 or a heat exchanger 81, the amount of heat available in the exhaust gas would be given off to the environment, without being used, and therefore the arrangement shown is able to increase the thermodynamic degree of effectiveness of the axial piston motor 1.

As has already been explained, the heat exchanger 81 has the membrane 86, which is also provided for load equalization, which allows a non-uniform length expanse between the exhaust gas chamber 83, the housing 82, and the working gas chamber 84, in the first place. The chambers mentioned above and the housing 82, which corresponds, in this case, to the exhaust gas chamber 83, are rigidly connected with one another at the end of the heat exchanger 81 that lies opposite the membrane 86. In this regard, the connection takes place by way of the screw connection 85, which seals off the two chambers, relative to one another and to the environment, in gastight manner.

In this connection, "rigidly" means the circumstance that length equalization, at the screw connection 85, of the components connected by means of this screw connection 85 is not possible or only possible to an insignificant extent. Length equalization in the transverse direction to a heat exchanger axis of symmetry 91 is not required, because of the design selected, to the extent that is required when using the membrane 86, in the longitudinal direction. The heat exchanger 81, in relation to its expanse in the transverse direction, has a significantly greater expanse in the longitudinal direction, thereby causing the non-uniform length expanse of the exhaust gas chamber 83, the working gas chamber 84, and, if applicable, the housing 82 to occur in the first place. In particular, by means of the elastic coupling that is implemented in this exemplary embodiment, by means of the membrane 86, differences in the length expanse of the housing 82 as well as the separation between exhaust gas chamber 83 and working gas chamber 84 can be equalized. Because the elastic coupling is provided at the cold end of the heat exchanger, the elasticity at this location can also be permanently guaranteed, if high temperatures, such as those that occur in an axial piston motor 1, must be managed.

The main burner 2 structured according to FIGS. 9 and 10 has a further fuel heating system that is configured as a glow plug 71. The glow plug 71 is situated within the fuel line 72, whereby the fuel line 72 flows around a heated end of the glow plug 71, forming a heating space 73, and there heated to the desired fuel temperature. The main fuel stream fed to this heating space 73 by way of the fuel line 72 can be derived, in steady-state operation, from the fuel hot stream 75 of the fuel heat exchanger 70. For a cold start, however, in which sufficient heat in the fuel heat exchanger 70 cannot be supplied to the fuel, the main fuel stream 24 fed to the main nozzle 22 is heated by way of the glow plug 71 that is shown. If necessary, temperature regulation can take place by way of the glow plug 71, while the fuel heat exchanger 70 is eliminated or while the fuel heat exchanger 70 merely makes basic energy available.

It is immediately evident that the specified arrangement of the glow plug 71 according to the embodiment explained above can be freely selected, and that a horizontal arrangement with reference to the main burner axis 51 is not necessarily required. The arrangement of the glow plug 71 relative to the main burner axis 51 that is shown, at an angle of 90°, is, however, advantageous for the construction space taken up by the axial piston motor 1, whereby this horizontal arrangement has an insignificantly negative influence on the total length of the axial piston motor.

In this connection, alternative heating means are also possible, in order to heat the fuel that flows through the heating space 73 to the desired temperature. Thus, in place of the glow plug 71, a heating wire can also be passed into the heating space 73 or along the surfaces of the heating space 73.

Furthermore, the configuration of the heating space 73 as shown is also not necessarily linked with the configuration of the heating means. Thus, the heating space 73, which is approximated to the shape of the glow plug, can also assume a non-cylindrical shape. In particular, it is possible to deviate from a cylindrical configuration of the heating space 73, if thereby the effective surface area of the heating space 73, in connection with a heat source recessed into the heating space wall, can be increased.

REFERENCE SYMBOL LIST 1 axial piston motor
2 main burner
3 pre-burner 4 auxiliary hot gas sensor
5 hot gas sensor
6 nozzle space sensor
7 mixing tube sensor
8 spark plug
9 Laval nozzle
10 power take-off shaft
11 compressor stage
12 expander stage
13 compressor piston
14 expander piston
15 compressor control drive
16 expander outlet valve
17 expander inlet valve
18 shot channel
19 combustion space bottom
21 main combustion space
22 main nozzle
23 main nozzle space
23A ring nozzle
24 main fuel stream
25 main air line
25A ring nozzle
25B nozzle surface
26 main air stream
27 main mixing tube
27A mixing nozzle
28 main combustion zone
29 main combustion space wall
30 hot gas feed
30A ring space
31 pre-combustion space
32 pre-nozzle
33 pre-nozzle space
34 pre-fuel stream
35 pre-air line
36 pre-air stream
37 pre-mixing tube
38 pre-combustion zone
39 pre-combustion space wall
40 auxiliary hot gas feed
44 exhaust gas line
51 main burner axis
52 pre-burner axis
53 feed axis
61 insulation
70 fuel heat exchanger
71 glow plug
72 fuel line
73 heating space
74 fuel cold stream
75 fuel hot stream
76 exhaust gas hot stream
77 exhaust gas intermediate stream
78 exhaust gas cold stream
79 working gas cold stream
80 working gas hot stream
81 heat exchanger
82 housing
83 exhaust gas chamber
84 working gas chamber
85 screw connection
86 membrane
87 exhaust gas chamber entry
88 exhaust gas chamber exit
89 working gas chamber entry
90 working gas chamber exit

What is claimed is:

1. An axial piston motor having at least one main burner, which has at least one main combustion space as well as at least one main nozzle space, and having at least one pre-burner that has at least one pre-combustion space as well as at least one pre-nozzle space, wherein the pre-combustion space is connected with the main nozzle space by way of at least one hot gas feed, further comprising an idle and at least one partial load, as well as a main nozzle of the main burner and a pre-nozzle of the pre-burner, wherein the main nozzle and the pre-nozzle are coupled with one another by means of a control unit.

2. The axial piston motor having at least one compressor stage, having said at least one main burner that has at least said combustion space as well as at least one main nozzle space having a main fuel stream, having said at least one pre-burner that has said at least one pre-combustion space as well as said at least one pre-nozzle space having a pre-fuel stream, and having at least one main air line between the compressor stage and a main mixing tube of the main burner, as well as at least one pre-air line between the compressor stage and a pre-mixing tube of the pre-burner, according to claim 1, further comprising at least one secondary air line between the compressor stage and the main burner, wherein the secondary air line is connected with the main burner at the main combustion space and/or downstream from the main combustion space.

3. The axial piston motor according to claim 1, wherein the main fuel stream has a heating means upstream from the main nozzle.

4. The axial piston motor, wherein the pre-burner has a pre-burner axis, the hot gas feed has a feed axis, and the main burner has a main burner axis, according to claim 1, wherein the pre-burner axis and/or the feed axis enclose(s) an angle between 75° and 105° with the main burner axis, at least in a projection plane that is oriented not only parallel to the main burner axis but also parallel to the pre-burner axis and/or to the feed axis.

5. The axial piston motor having said at least one main burner, which has said at least one main combustion space as well as at least one main nozzle space, and having said at least one pre-burner that has said at least one pre-combustion space as well as at least one pre-nozzle space, according to claim 1.

6. The axial piston motor according to claim 5, wherein a ring space is provided on the pre-burner side of the main nozzle space.

7. The axial piston motor according to claim 5, wherein a ring nozzle for hot gas feed into the main nozzle space is provided on the pre-burner side of the main nozzle space.

8. The axial piston motor according to claim 5, wherein the main burner has a ring nozzle on the main nozzle space side of a main mixing tube.

9. The axial piston motor according to claim 5, wherein the pre-combustion space and/or the pre-nozzle space has/have an insulation on an outer wall.

10. A method for operation of an axial piston motor having at least one main burner and having at least one pre-burner, wherein an exhaust gas stream of the pre-burner is mixed into a main fuel stream of the main burner, comprising an idle and at least one partial load, wherein the main burner is ignited during a load jump from idle to a lowest partial load, using the main fuel stream, and wherein a pre-fuel stream of the pre-burner is reduced during the load jump, by at least half the amount of the main fuel stream.

11. The method according to claim 10, wherein the exhaust gas stream mixed into the main fuel stream is formed by the pre-air stream and a pre-fuel stream.

12. A method for operation of an axial piston motor having at least one compressor stage, having at least one main burner and having at least one pre-burner, wherein the compressor stage feeds a main air stream to the main burner and a pre-air stream to the pre-burner, and wherein an exhaust gas stream from the pre-burner is mixed into a main fuel stream of the main burner, wherein a combustion air ratio between a pre-fuel stream and the pre-air stream as well as a combustion air ratio between the main fuel stream and the main air stream can be adjusted in one stage.

13. The method according to claim 12, wherein the main fuel stream and the main air stream are mixed upstream from a main combustion space.

14. A method for operation of an axial piston motor having at least one main burner that has at least one main combustion space as well as at least one main nozzle space with a main fuel stream, and having at least one pre-burner that has at least one pre-combustion space as well as at least one pre-nozzle space with a pre-fuel stream, wherein the pre-combustion space is connected with the main nozzle space by way of at least one hot gas feed, and having an air stream that has a main air stream for the main burner as well as a pre-air stream for the pre-burner, wherein during idle and/or a partial load of the axial piston motor, but at least during a load jump from idle to a lowest partial load, at least one secondary air stream is taken from the air stream, and the secondary air stream is fed into an exhaust gas stream downstream from and/or within the main combustion space.

15. The method according to claim 14, wherein the exhaust gas stream of the pre-burner is fed into the main nozzle space tangentially from a ring space.

* * * * *